US008289370B2

(12) United States Patent
Civanlar et al.

(10) Patent No.: US 8,289,370 B2
(45) Date of Patent: Oct. 16, 2012

(54) SYSTEM AND METHOD FOR SCALABLE AND LOW-DELAY VIDEOCONFERENCING USING SCALABLE VIDEO CODING

(75) Inventors: Mehmet Reha Civanlar, Palo Alto, CA (US); Alexandros Eleftheriadis, Tenafly, NJ (US); Danny Hong, New York, NY (US); Ofer Shapiro, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 1195 days.

(21) Appl. No.: 12/015,956

(22) Filed: Jan. 17, 2008

(65) Prior Publication Data

US 2008/0211901 A1    Sep. 4, 2008

Related U.S. Application Data

(63) Continuation of application No. PCT/US2006/028365, filed on Jul. 21, 2006.

(60) Provisional application No. 60/701,108, filed on Jul. 20, 2005, provisional application No. 60/714,741, filed on Sep. 7, 2005, provisional application No. 60/723,392, filed on Oct. 4, 2005, provisional application No. 60/775,100, filed on Feb. 21, 2006.

(51) Int. Cl.
*H04N 7/15* (2006.01)
(52) U.S. Cl. .................................. 348/14.12; 348/14.09
(58) Field of Classification Search ............... 348/14.12, 348/14.08, 14.09, 14.01
See application file for complete search history.

(56) References Cited

U.S. PATENT DOCUMENTS

| | | | |
|---|---|---|---|
| 4,958,226 A | 9/1990 | Haskell et al. |
| 5,136,377 A | 8/1992 | Johnston et al. |
| 5,227,878 A | 7/1993 | Puri et al. |
| 5,500,678 A | 3/1996 | Puri |
| 5,563,593 A | 10/1996 | Puri |
| 6,014,694 A | 1/2000 | Aharoni et al. |
| 6,085,252 A | 7/2000 | Zhu et al. |
| 6,097,697 A | 8/2000 | Yao et al. |
| 6,496,217 B1 | 12/2002 | Piotrowski |
| 6,643,496 B1 | 11/2003 | Shimoyama et al. |
| 7,012,893 B2 | 3/2006 | Bahadiroglu |
| 7,295,520 B2 | 11/2007 | Lee et al. |
| 7,342,880 B2 | 3/2008 | Yanagihara et al. |
| 7,542,435 B2 | 6/2009 | Leon et al. |
| 7,593,339 B2 | 9/2009 | Shoemake et al. |
| 7,701,851 B2 | 4/2010 | Chakareski et al. |

(Continued)

FOREIGN PATENT DOCUMENTS

EP    1445958    8/2004

(Continued)

OTHER PUBLICATIONS

Jinzenji, et al., "Scalable Video Conference System Using MPEG-4 ASP/FGS Software CODECs, IEICE Technical Report", *The Institute of Electronics, Information and Communication Engineers*, Mar. 18, 2005, 104(752):55-60. (English Abstract only).

(Continued)

*Primary Examiner* — Stella Woo
(74) *Attorney, Agent, or Firm* — Baker Botts L.L.P.

(57) ABSTRACT

Scalable video codecs are provided for use in videoconferencing systems and applications hosted on heterogeneous endpoints/receivers and network environments. The scalable video codecs provide a coded representation of a source video signal at multiple temporal, quality, and spatial resolutions.

71 Claims, 21 Drawing Sheets

U.S. PATENT DOCUMENTS

| | | | |
|---|---|---|---|
| 7,817,625 | B2 | 10/2010 | Jefremov |
| 2002/0136162 | A1 | 9/2002 | Yoshimura et al. |
| 2004/0086041 | A1* | 5/2004 | Ye et al. .................. 375/240.08 |
| 2004/0114817 | A1 | 6/2004 | Jayant et al. |
| 2004/0170395 | A1 | 9/2004 | Filippini et al. |
| 2004/0252758 | A1 | 12/2004 | Katsavounidis et al. |
| 2005/0058065 | A1 | 3/2005 | Tiller et al. |
| 2006/0023748 | A1 | 2/2006 | Chandhok et al. |
| 2006/0224763 | A1 | 10/2006 | Altunbasak et al. |
| 2007/0133405 | A1 | 6/2007 | Bowra et al. |

FOREIGN PATENT DOCUMENTS

| | | |
|---|---|---|
| JP | 1997-116903 | 5/1997 |
| WO | WO 2004/036916 A1 | 4/2004 |

OTHER PUBLICATIONS

S. Wenger, "Video Redundancy Coding in H.263+", Workshop on Audio-Visual Services for packet networks (aka Packet Video Workshop), 1997, 6 pages.
U.S. Appl. No. 11/491,057, filed Jul. 20, 2006, (Abandoned).
U.S. Appl. No. 11/953,398, filed Dec. 10, 2007.
U.S. Appl. No. 12/715,845, filed Mar. 2, 2010.
U.S. Appl. No. 13/052,741, filed Mar. 21, 2011.
U.S. Appl. No. 11/933,865, filed May 11, 2009 Non-Final Office Action.
U.S. Appl. No. 11/933,865, filed Dec. 11, 2009 Response to Non-Final Office Action.
U.S. Appl. No. 11/933,865, filed Dec. 2, 2009 Notice of Allowance and Examiner's.
U.S. Appl. No. 11/953,398, filed Oct. 20, 2009 Non-Final Office Action.
U.S. Appl. No. 11/953,398, filed Apr. 20, 2010 Response to Non-Final Office Action.
U.S. Appl. No. 11/953,398, filed Jul. 23, 2010 Final Office Action.
U.S. Appl. No. 11/953,398, filed Oct. 22, 2010 Response to Final Office Action.
U.S. Appl. No. 11/953,398, filed Nov. 23, 2010 Advisory Action.
U.S. Appl. No. 11/953,398, filed Nov. 23, 2010 Amendment and response to Advisory Action.
U.S. Appl. No. 11/953,398, filed Dec. 21, 2010 Notice of Allowance.
U.S. Appl. No. 12/715,845, filed Mar. 12, 2010 Notice to Correct Application Papers.
U.S. Appl. No. 12/715,845, filed May 6, 2010 Response to Correct Application Papers.
U.S. Appl. No. 12/715,845, filed Jan. 18, 2011 Notice of Allowance.
International Search Report and Written Opinion—PCT/US06/028365 (International Filing Date: Jul. 21, 2006).

* cited by examiner

SVCS SWITCH LAYER CONFIGURATION MATRIX

|  | TRANSMIT TO | | | |
|---|---|---|---|---|
| RECEIVED FROM | USER 1 | USER 2 | ... | USER n |
| USER 1 | S11 | S12 | ... | S1n |
| USER 2 | S21 | S22 | ... | S2n |
| ... | ... | ... | ... | ... |
| USER N | Sn1 | Sn2 | ... | Snn |

FIG. 19

SVCS NETWORK CONFIGURATION MATRIX

CHANNEL ASSIGNMENTS

| USERS | RECEIVE PORT | TRANSMIT PORT |
|---|---|---|
| USER 1 | R1 | T1 |
| USER 2 | R2 | T2 |
| ⋮ | ⋮ | ⋮ |
| USER N | Rn | Tn |

FIG. 20

SYSTEM AND METHOD FOR SCALABLE AND LOW-DELAY VIDEOCONFERENCING USING SCALABLE VIDEO CODING

CROSS-REFERENCE TO RELATED APPLICATIONS

This application is a continuation of PCT International Application No. PCT/US06/028365 filed Jul. 21, 2006 which claims the benefit of U.S. provisional patent application Ser. Nos. 60/701,108 filed Jul. 20, 2005, 60/714,741 filed Sep. 7, 2005 60/723,392 filed Oct. 4, 2005, and 60/775,100 filed Feb. 21, 2006. Further, this application is related to International application Nos. PCT/US2006/028366 filed Jul. 20, 2006, PCT/US2006/028367 filed Jul. 20, 2006, and PCT/US2006/028368 filed Jul. 20, 2006. All of the aforementioned priority and related applications are hereby incorporated by reference herein in their entireties, and from which priority is claimed.

FIELD OF THE INVENTION

The present invention relates to multimedia and telecommunications technology. In particular, the invention relates to systems and methods for videoconferencing between user endpoints with diverse access equipment or terminals, and over inhomogeneous network links.

BACKGROUND OF THE INVENTION

Videoconferencing systems allow two or more remote participants/endpoints to communicate video and audio with each other in real-time using both audio and video. When only two remote participants are involved, direct transmission of communications over suitable electronic networks between the two endpoints can be used. When more than two participants/endpoints are involved, a Multipoint Conferencing Unit (MCU), or bridge, is commonly used to connect to all the participants/endpoints. The MCU mediates communications between the multiple participants/endpoints, which may be connected, for example, in a star configuration.

For a videoconference, the participants/endpoints or terminals are equipped with suitable encoding and decoding devices. An encoder formats local audio and video output at a transmitting endpoint into a coded form suitable for signal transmission over the electronic communication network. A decoder, in contrast, processes a received signal, which has encoded audio and video information, into a at decoded form suitable for audio playback or image display at a receiving endpoint.

Traditionally, an end-user's own image is also displayed on his/her screen to provide feedback (to ensure, for example, proper positioning of the person within the video window).

In practical videoconferencing system implementations over communication networks, the quality of an interactive videoconference between remote participants is determined by end-to-end signal delays. End-to-end delays of greater than 200 ms prevent realistic live or natural interactions between the conferencing participants. Such long end-to-end delays cause the videoconferencing participants to unnaturally restrain themselves from actively participating or responding in order to allow in-transit video and audio data from other participants to arrive at their endpoints.

The end-to-end signal delays include acquisition delays (e.g., the time it takes to fill up a buffer in an A/D converter), coding delays, transmission delays (the time it takes to submit a packet-full of data to the network interface controller of an endpoint), and transport delays (the time a packet travels in a communication network from endpoint to endpoint). Additionally, signal-processing times through mediating MCUs contribute to the total end-to-end delay in the given system.

An MCU's primary tasks are to mix the incoming audio signals so that a single audio stream is transmitted to all participants, and to mix video frames or pictures transmitted by individual participants/endpoints into a common composite video frame stream, which includes a picture of each participant. It is noted that the terms frame and picture are used interchangeably herein, and further that coding of interlaced frames as individual fields or as combined frames (field-based or frame-based picture coding) can be incorporated as is obvious to persons skilled in the art. The MCUs, which are deployed in conventional communication networks systems, only offer a single common resolution (e.g., CIF or QCIF resolution) for all the individual pictures mixed into the common composite video frame distributed to all participants in a videoconferencing session. Thus, conventional communication networks systems do not readily provide customized videoconferencing functionality by which a participant can view other participants at different resolutions. Such desirable functionality allows the participant, for example, to view another specific participant (e.g., a speaking participant) in CIF resolution and view other, silent participants in QCIF resolution. MCUs can be configured to provide this desirable functionality by repeating the video mixing operation, as many times as the number of participants in a videoconference. However, in such configurations, the MCU operations introduce considerable end-to-end delay. Further, the MCU must have sufficient digital signal processing capability to decode multiple audio streams, mix, and re-encode them, and also to decode multiple video streams, composite them into a single frame (with appropriate scaling as needed), and re-encode them again into a single stream. Video conferencing solutions (such as the systems commercially marketed by Polycom Inc., 4750 Willow Road, Pleasanton, Calif. 94588, and Tandberg, 200 Park Avenue, New York, N.Y. 10166) must use dedicated hardware components to provide acceptable quality and performance levels.

The performance levels of and the quality delivered by a videoconferencing solution are also a strong function of the underlying communication network over which it operates. Videoconferencing solutions, which use ITU H.261, H.263, and H.264 standard video codecs, require a robust communication channel with little or no loss for delivering acceptable quality. The required communication channel transmission speeds or bitrates can range from 64 Kbps up to several Mbps. Early videoconferencing solutions used dedicated ISDN lines, and newer systems often utilize high-speed Internet connections (e.g., fractional T1, T1, T3, etc.) for high-speed transmission. Further, some videoconferencing solutions exploit Internet Protocol ("IP") communications, but these are implemented in a private network environment to ensure bandwidth availability. In any case, conventional videoconferencing solutions incur substantial costs associated with implementing and maintaining the dedicated high-speed networking infrastructure needed for quality transmissions.

The costs of implementing and maintaining a dedicated videoconferencing network are avoided by recent "desktop videoconferencing" systems, which exploit high bandwidth corporate data network connections (e.g., 100 Mbit, Ethernet). In these desktop videoconferencing solutions, common personal computers (PCs), which are equipped with USB-based digital video cameras and appropriate software applications for performing encoding/decoding and network transmission, are used as the participant/endpoint terminals.

Recent advances in multimedia and telecommunications technology involve integration of video communication and conferencing capabilities with Internet Protocol ("IP") communication systems such as IP PBX, instant messaging, web conferencing, etc. In order to effectively integrate video conferencing into such systems, both point-to-point and multipoint communications must be supported. However, the available network bandwidth in IP communication systems can fluctuate widely (e.g., depending on time of day and overall network load), making these systems unreliable for the high bandwidth transmissions required for video communications. Further, videoconferencing solutions implemented on IP communication systems must accommodate both network channel heterogeneity and endpoint equipment diversity associated with the Internet system. For example, participants may access videoconferencing services over IP channels having very different bandwidths (e.g., DSL vs. Ethernet) using a diverse variety of personal computing devices.

The communication networks on which videoconferencing solutions are implemented can be categorized as providing two basic communication channel architectures. In one basic architecture, a guaranteed quality of service (QoS) channel is provided via a dedicated direct or switched connection between two points (e.g., ISDN connections, T1 lines, and the like). Conversely, in the second basic architecture, the communication channels do not guarantee QoS, but are only "best-effort" packet delivery channels such as those used in Internet Protocol (IP)-based networks (e.g., Ethernet LANs).

Implementing video conferencing solutions on IP-based networks may be desirable, at least due to the low cost, high total bandwidth, and widespread availability of access to the Internet. As noted previously, IP-based networks typically operate on a best-effort basis, i.e., there is no guarantee that packets will reach their destination, or that they will arrive in the order they were transmitted. However, techniques have been developed to provide different levels of quality of service (QoS) over the putatively best-effort channels. The techniques may include protocols such as DiffServ for specifying and controlling network traffic by class so that certain types of traffic get precedence and RSVP. These protocols can ensure certain bandwidth and/or delays for portions of the available bandwidth. Techniques such as forward error correction (FEC) and automatic repeat request (ARQ) mechanisms may also be used to improve recovery mechanisms for lost packet transmissions and to mitigate the effects of packet loss.

Implementing video conferencing solutions on IP-based networks requires consideration of the video codecs used. Standard video codecs such as the standard H.261, H.263 codecs designated for videoconferencing and standard MPEG-1 and MPEG-2 Main Profile codecs designated for Video CDs and DVDs, respectively, are designed to provide a single bitstream ("single-layer") at a fixed bitrate. Some of these codecs may be deployed without rate control to provide a variable bitrate stream (e.g., MPEG-2, as used in DVDS). However, in practice, even without rate control, a target operating bitrate is established depending on the specific infrastructure. These video codecs designs are based on the assumption that the network is able to provide a constant bitrate, and a practically error-free channel between the sender and the receiver. The H-series Standard codecs, which are designed specifically for person-to-person communication applications, offer some additional features to increase robustness in the presence of channel errors, but are still only tolerant to a very small percentage of packet losses (typically only up to 2-3%).

Further, the standard video codecs are based on "single-layer" coding techniques, which are inherently incapable of exploiting the differentiated QoS capabilities provided by modern communication networks. An additional limitation of the single-layer coding techniques for video communications is that even if a lower spatial resolution display is required or desired in an application, a full resolution signal must be received and decoded with downscaling performed at a receiving endpoint or MCU. This wastes bandwidth and computational resources.

In contrast to the aforementioned single-layer video codecs, in "scalable" video codecs based on "multi-layer" coding techniques, two or more bitstreams are generated for a given source video signal: a base layer and one or more enhancement layers. The base layer may be a basic representation of the source signal at a minimum quality level. The minimum quality representation may be reduced in the SNR (quality), spatial, or temporal resolution aspects or a combination of these aspects of the given source video signal. The one or more enhancement layers correspond to information for increasing the quality of the SNR (quality), spatial, or temporal resolution aspects of the base layer. Scalable video codecs have been developed in view of heterogeneous network environments and/or heterogeneous receivers. The base layer can be transmitted using a reliable channel, i.e., a channel with guaranteed Quality of Service (QoS). Enhancement layers can be transmitted with reduced or no QoS. The effect is that recipients are guaranteed to receive a signal with at least a minimum level of quality (the base layer signal). Similarly, with heterogeneous receivers that may have different screen sizes, a small picture size signal may be transmitted to, e.g., a portable device, and a full size picture may be transmitted to a system equipped with a large display.

Standards such as MPEG-2 specify a number of techniques for performing scalable coding. However, practical use of "scalable" video codecs has been hampered by the increased cost and complexity associated with scalable coding, and the lack of widespread availability of high bandwidth IP-based communication channels suitable for video.

Consideration is now being given to developing improved scalable codec solutions for video conferencing and other applications. Desirable scalable codec solutions will offer improved bandwidth, temporal resolution, spatial quality, spatial resolution, and computational power scalability. Attention is in particular directed to developing scalable video codecs that are consistent with simplified MCU architectures for versatile videoconferencing applications. Desirable scalable codec solutions will enable zero-delay MCU architectures that allow cascading of MCUs in electronic networks with no or minimal end-to-end delay penalties.

SUMMARY OF THE INVENTION

The present invention provides scalable video coding (SVC) systems and methods (collectively, "solutions") for point-to-point and multipoint conferencing applications. The SVC solutions provide a coded "layered" representation of a source video signal at multiple temporal, quality, and spatial resolutions. These resolutions are represented by distinct layer/bitstream components that are created by endpoint/terminal encoders.

The SVC solutions are designed to accommodate diversity in endpoint/receivers devices and in heterogeneous network characteristics, including, for example, the best-effort nature of networks such as those based on the Internet Protocol. The scalable aspects of the video coding techniques employed allow conferencing applications to adapt to different network conditions, and also accommodate different end-user requirements (e.g., a user may elect to view another user at a high or low spatial resolution).

Scalable video codec designs allow error-resilient transmission of video in point-to-point and multipoint scenarios, and allow a conferencing bridge to provide continuous presence, rate matching, error localization, random entry and personal layout conferencing features, without decoding or recoding in-transit video streams and without any decrease in the error resilience of the stream.

An endpoint terminal, which is designed for video communication with other endpoints, includes video encoders/decoders that can encode a video signal into one or more layers of a multilayer scalable video format for transmission. The video encoders/decoders can correspondingly decode received video signal layers, simultaneously or sequentially, in as many video streams as the number of participants in a videoconference. The terminal maybe implemented in hardware, software, or a combination thereof in a general-purpose PC or other network access device. The scalable video codecs incorporated in the terminal may be based on coding methods and techniques that are consistent with or based on industry standard encoding methods such as H.264.

In an H.264 based SVC solution, a scalable video codec creates a base layer that is based on standard H.264 AVC encoding. The scalable video codec further creates a series of SNR enhancement layers by successively encoding, using again H.264 AVC, the difference between the original signal and the one coded at the previous layer with an appropriate offset. In a version of this scalable video codec, DC values of the direct cosine transform (DCT) coefficients are not coded in the enhancement layers, and further, a conventional deblocking filter is not used.

In an SVC solution, which is designed to use SNR scalability as a means of implementing spatial scalability, different quantization parameters (QP) are selected for the base and enhancement layers. The base layer, which is encoded at higher QP, is optionally low-pass filtered and downsampled for display at receiving endpoints/terminals.

In another SVC solution, the scalable video codec is designed as a spatially scalable encoder in which a reconstructed base layer H.264 low-resolution signal is upsampled at the encoder and subtracted from the original signal. The difference is fed to the standard encoder operating at high resolution, after being offset by a set value. In another version, the upsampled H.264 low-resolution signal is used as an additional possible reference frame in the motion estimation process of a standards-based high-resolution encoder.

The SVC solutions may involve adjusting or changing threading modes or spatial scalability modes to dynamically respond to network conditions and participants' display preferences.

BRIEF DESCRIPTION OF THE DRAWINGS

Further features of the invention, its nature, and various advantages will be more apparent from the following detailed description of the preferred embodiments and the accompanying drawing in which:

FIGS. 19 and 20 are illustrations of exemplary SVCS Switch Layer and Network Layer Configuration Matrices, in accordance with the principles of the present invention.

Figure 1A:
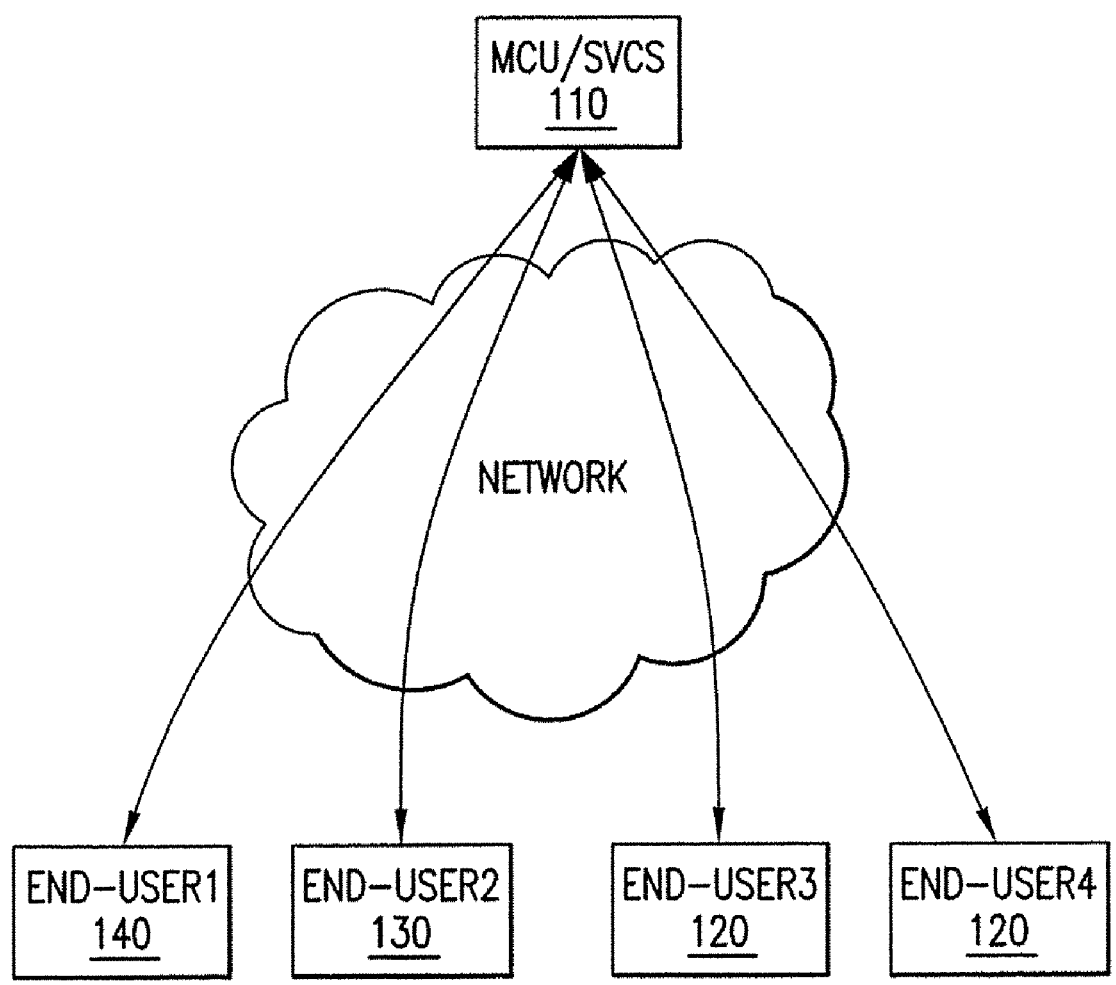
FIGS. 1A and 1B are schematic diagrams illustrating exemplary architectures of a videoconferencing system, in accordance with the principles of the present invention.

Throughout the figures, unless otherwise stated, the same reference numerals and characters are used to denote like features, elements, components or portions of the illustrated embodiments. Moreover, while the present invention will now be described in detail with reference to the figures, it is done so in connection with the illustrative embodiments.

DETAILED DESCRIPTION OF THE INVENTION

The present invention provides systems and techniques for scalable video coding (SVC) of video data signals for multipoint and point-to-point video conferencing applications. The SVC systems and techniques (collectively "solutions") are designed to allow the tailoring or customization of delivered video data in response to different user participants/endpoints, network transmission capabilities, environments, or other requirements in a videoconference. The inventive SVC solutions provide compressed video data in a multilayer format, which can be readily switched layer-by-layer between conferencing participants using convenient zero- or low-algorithmic delay switching mechanisms. Exemplary zero- or low-algorithmic delay switching mechanisms—Scalable Video Coding Servers (SVCS), are described in co-filed international Application PCT/US2006/028366.

Figure 1B:
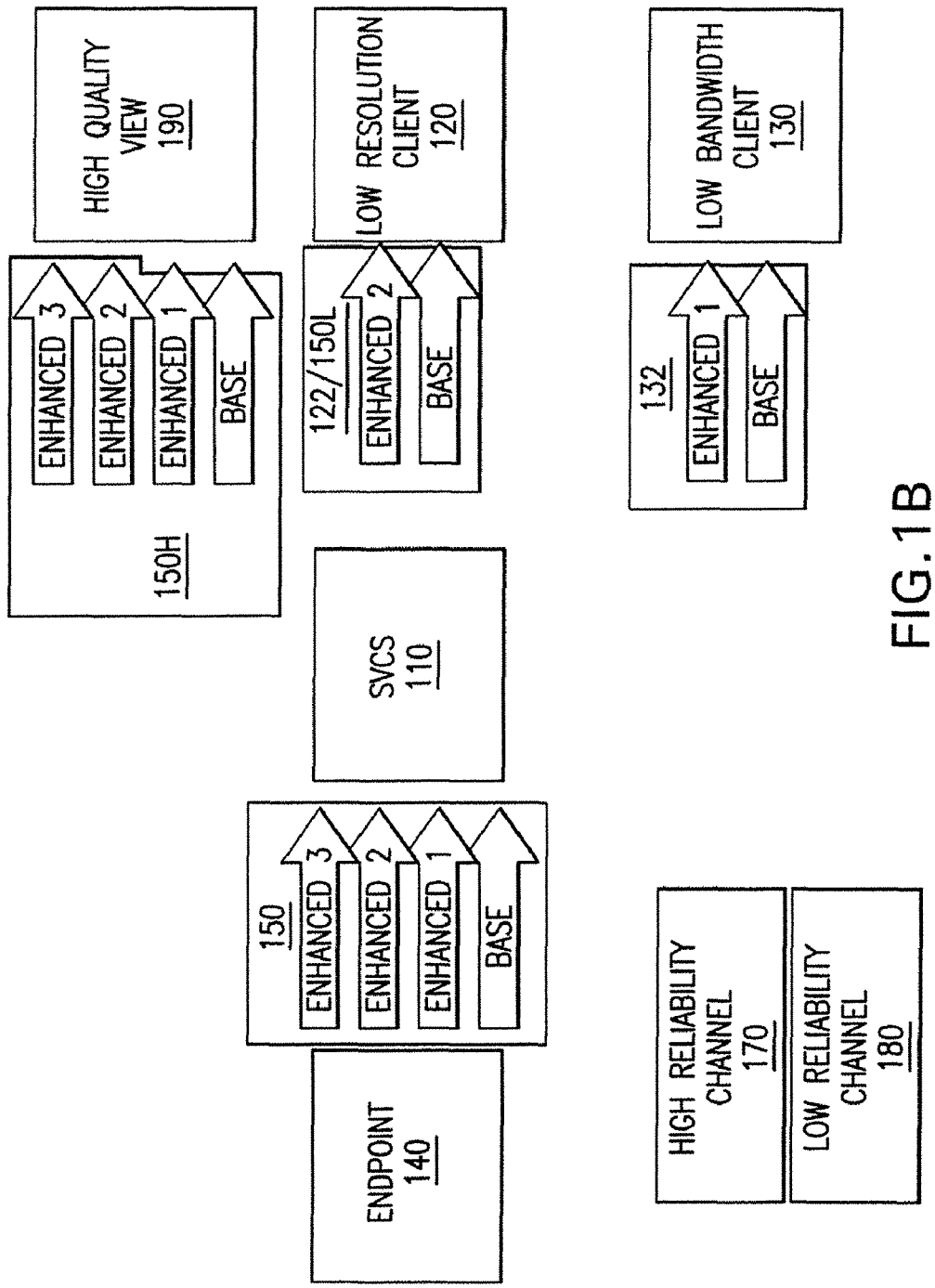

FIGS. 1A and 1B show exemplary videoconferencing system 100 arrangements based on the inventive SVC solutions. Videoconferencing system 100 may be implemented in a heterogeneous electronic or computer network environment, for multipoint and point-to-point client conferencing applications. System 100 uses one or more networked servers (e.g., an SVCS or MCU 110), to coordinate the delivery of customized data to conferencing participants or clients 120, 130, and 140. As described in co-pending International Application PCT/US2006/028366, MCU 110 may coordinate the delivery of a video stream 150 generated by endpoint 140 for transmission to other conference participants. In system 100, a video stream is first suitably coded or scaled down using the inventive SVC techniques into a multiplicity of data components or layers. The multiple data layers may have differing characteristics or features (e.g., spatial resolutions, frame rates, picture quality, signal-to-noise ratio qualities (SNR), etc.). The differing characteristics or features of the data layers may be suitably selected in consideration, for example, of the varying individual user requirements and infrastructure specifications in the electronic network environment (e.g., CPU capabilities, display size, user preferences, and bandwidths). MCU 110 is suitably configured to select an appropriate amount of information (i.e., SVC layers) for each particular participant/recipient in the conference from a received data stream (e.g., SVC video stream 150), and to forward only the selected or requested amounts of information/layers to the respective participants/recipients 120-130. MCU 110 may be configured to make the suitable selections in response to receiving-endpoint requests (e.g., the picture quality requested by individual conference participants) and upon consideration of network conditions and policies.

This customized data selection and forwarding scheme exploits the internal structure of the SVC video stream, which allows clear division of the video stream into multiple layers having different resolutions, frame rates, and/or bandwidths, etc. FIG. 1B, which is reproduced from the referenced International Application PCT/US2006/028366, shows an exemplary internal structure of SVC video stream 150 that represents a media input of endpoint 140 to the conference. The exemplary internal structure of SVC video stream 150 includes a "base" layer 150$b$, and one or more distinct "enhancement" layers 150$a$.

Figure 2:
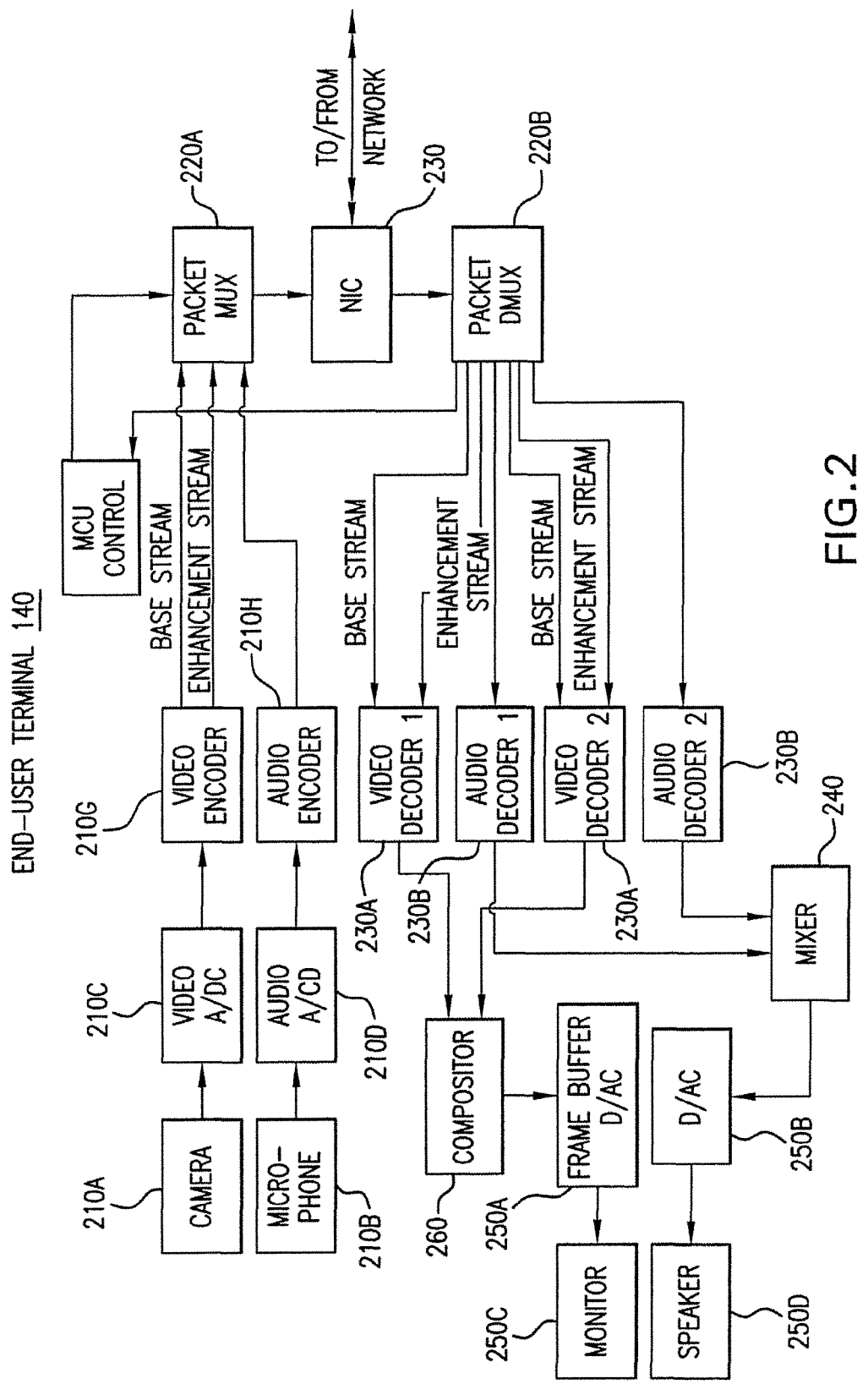
FIG. 2 is a block diagram illustrating an exemplary end-user terminal, in accordance with the principles of the present invention.

FIG. 2 shows an exemplary participant/endpoint terminal 140, which is designed for use with SVC-based videoconferencing systems (e.g., system 100). Terminal 140 includes human interface input/output devices (e.g., a camera 210A, a microphone 210B, a video display 250C, a speaker 250D), and a network interface controller card (NC) 230 coupled to input and output signal multiplexer and demultiplexer units (e.g., packet MUX 220A and packet DMUX 220B). NIC 230 may be a standard hardware component, such as an Ethernet LAN adapter, or any other suitable network interface device.

Camera 210A and microphone 210B are designed to capture participant video and audio signals, respectively, for transmission to other conferencing participants. Conversely, video display 250C and speaker 250D are designed to display and play back video and audio signals received from other participants, respectively. Video display 250C may also be configured to optionally display participant/terminal 140's own video. Camera 210A and microphone 210B outputs are coupled to video and audio encoders 210G and 210H via analog-to-digital converters 210E and 210F, respectively. Video and audio encoders 210G and 210H are designed to compress input video and audio digital signals in order to reduce the bandwidths necessary for transmission of the signals over the electronic communications network. The input video signal may be live, or pre-recorded and stored video signals.

Video encoder 210G has multiple outputs connected directly to packet MUX 220A. Audio encoders 210H output is also connected directly to packet MUX 220A. The compressed and layered video and audio digital signals from encoders 210G and 210H are multiplexed by packet MUX 220A for transmission over the communications network via NIC 230. Conversely, compressed video and audio digital signals received over the communications network by NIC 230 are forwarded to packet DMUX 220B for demultiplexing and further processing in terminal 140 for display and playback over video display 250C and speaker 250D.

Captured audio signals may be encoded by audio encoder 210H using any suitable encoding techniques including known techniques, for example, G.711 and MPEG-1. In an implementation of videoconferencing system 100 and terminal 140, G.711 encoding is preferred for audio encoding. Captured video signals are encoded in a layered coding format by video encoder 210G using the SVC techniques described herein. Packet MUX 220A may be configured to multiplex the input video and audio signals using, for example, the RTP protocol or other suitable protocols. Packet MUX 220A also may be configured to implement any needed QoS-related protocol processing.

In system 100, each stream of data from terminal 140 is transmitted in its own virtual channel (or port number in IP terminology) over the electronics communication network. In an exemplary network configuration, QoS may be provided via Differentiated Services (DiffServ) for specific virtual channels or by any other similar QoS-enabling technique. The required QoS setups are performed prior to use of the systems described herein. DiffServ (or the similar QoS-enabling technique used) creates two different categories of channels implemented via or in network routers (not shown). For convenience in description, the two different categories of channels are referred to herein as "high reliability" (HRC) and "low reliability" (LRC) channels, respectively. In the absence of an explicit method for establishing an HRC or if the HRC itself is not reliable enough, the endpoint (or the MCU 110 on behalf of the endpoint) may (i) proactively transmit the information over the HRC repeatedly (the actual number of repeated transmissions may depend on channel error conditions), or (ii) cache and retransmit information upon the request of a receiving endpoint or SVCS, for example, in instances where information loss in transmission is detected and reported immediately. These methods of establishing an HRC can be applied in the client-to-MCU, MCU-to-client, or MCU-to-MCU connections individually or in any combination, depending on the available channel type and conditions.

For use in a multi-participant videoconferencing system, terminal 140 is configured with one or more pairs of video and audio decoders (e.g., decoders 230A and 230B) designed to decode signals received from the conferencing participants who are to be seen or heard at terminal 140. The pairs of decoders 230A and 230B may be designed to process signals individually participant-by-participant or to sequentially process a number of participant signals. The configuration or combinations of pairs of video and audio decoders 230A and 230B included in terminal 140 may be suitably selected to process all participant signals received at terminal 140 with consideration of the parallel and/or sequential processing design features of the encoders. Further, packet DMUX 220B may be configured to receive packetized signals from the conferencing participants via NIC 230, and to forward the signals to appropriate pairs of video and audio decoders 230A and 230B for parallel and/or sequential processing.

Further in terminal 140, audio decoder 230B outputs are connected to audio mixer 240 and a digital-to-analog converter (DA/C) 250B, which drives speaker 250D to play back received audio signals. Audio mixer 240 is designed to combine individual audio signals into a single signal for playback. Similarly, video decoder 230A outputs are combined in frame buffer 250A by a compositor 260. A combined or composite video picture from frame buffer 250A is displayed on monitor 250C.

Compositor 260 may be suitably designed to position each decoded video picture at a corresponding designated position in the composite frame or displayed picture. For example, monitor 250C display may be split into four smaller areas. Compositor 260 may obtain pixel data from each of video decoders 230A in terminal 140 and place the pixel data in an appropriate frame buffer 250A position (e.g., filling up the lower right picture). To avoid double buffering (e.g., once at the output of decoder 230B and once at frame buffer 250A), compositor 260 may, for example, be configured as an address generator that drives the placement of output pixels of decoder 230B. Alternative techniques for optimizing the placement of individual video decoder 230A outputs on display 210 C may also be used to similar effect.

It will be understood that the various terminal 140 components shown in FIG. 2 may be implemented in any suitable combination of hardware and/or software components, which are suitably interfaced with each other. The components may be distinct stand-alone units or integrated with a personal computer or other device having network access capabilities.

With reference to video encoders used in terminal 140 for scalable video coding, FIGS. 3-9 respectively show various scalable video encoders or codecs 300-900 that may be deployed in terminal 140.

Figure 3:
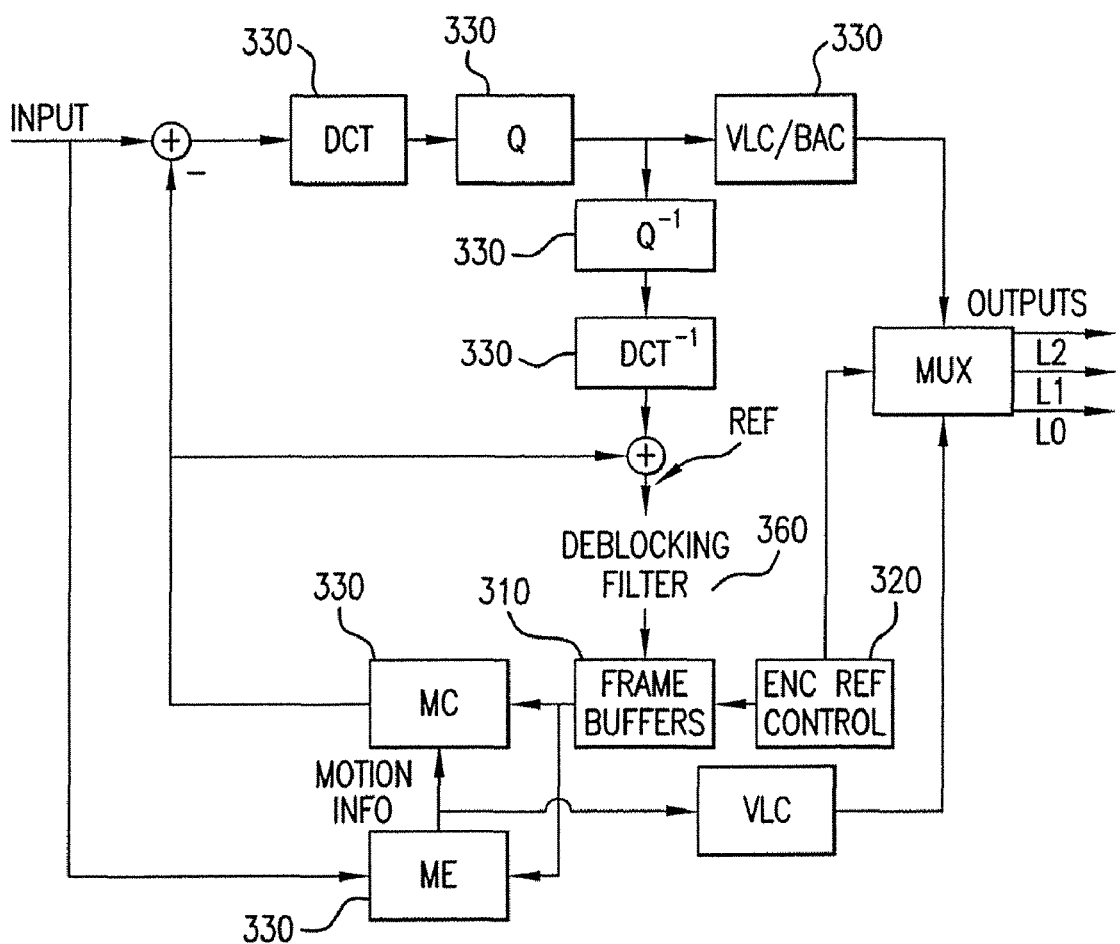
FIG. 3 is a block diagram illustrating an exemplary architecture of an encoder for the base and temporal enhancement layers (i.e., layers 0 though 2), in accordance with the principles of the present invention.

FIG. 3 shows exemplary encoder architecture 300 for compressing input video signals in a layered coding format (e.g., layers L0, L1, and L2 in SVC terminology, where L0 is the lowest frame rate). Encoder architecture 300 represents a motion-compensated, block-based transform codec based, for example, on a standard H.264/MPEG-4 AVC design or other suitable codec designs. Encoder architecture 300 includes a FRAME BUFFERS block 310, an ENC REF CONTROL block 320, and a DeBlocking Filter block 360 in addition to conventional "text-book" variety video coding process blocks 330 for motion estimation (ME), motion compensation (MC), and other encoding functions. The motion-compensated, block-based codec used in system 100/terminal 140 may be a single-layer temporally predictive codec, which has a regular structure of I, P, and B pictures. A picture sequence (in display order) may, for example, be "IBBPBBP". In the picture sequence, the 'P' pictures are predicted from the previous P or I picture, whereas the B pictures are predicted using both the previous and next P or I picture. Although the number of B pictures between successive I or P pictures can vary, as can the rate in which I pictures appear, it is not possible, for example, for a P picture to use as a reference for prediction another P picture that is earlier in time than the most recent one. Standard H.264 coding advantageously provides an exception in that two reference picture lists are maintained by the encoder and decoder, respectively. This exception is exploited by the present invention to select which pictures are used as references and also which references are used for a particular picture that is to be coded. In FIG. 3, FRAME BUFFERS block 310 represents memory for storing the reference picture list(s). ENC REF CONTROL block 310 is designed to determine which reference picture is to be used for the current picture at the encoder side.

Figure 4:
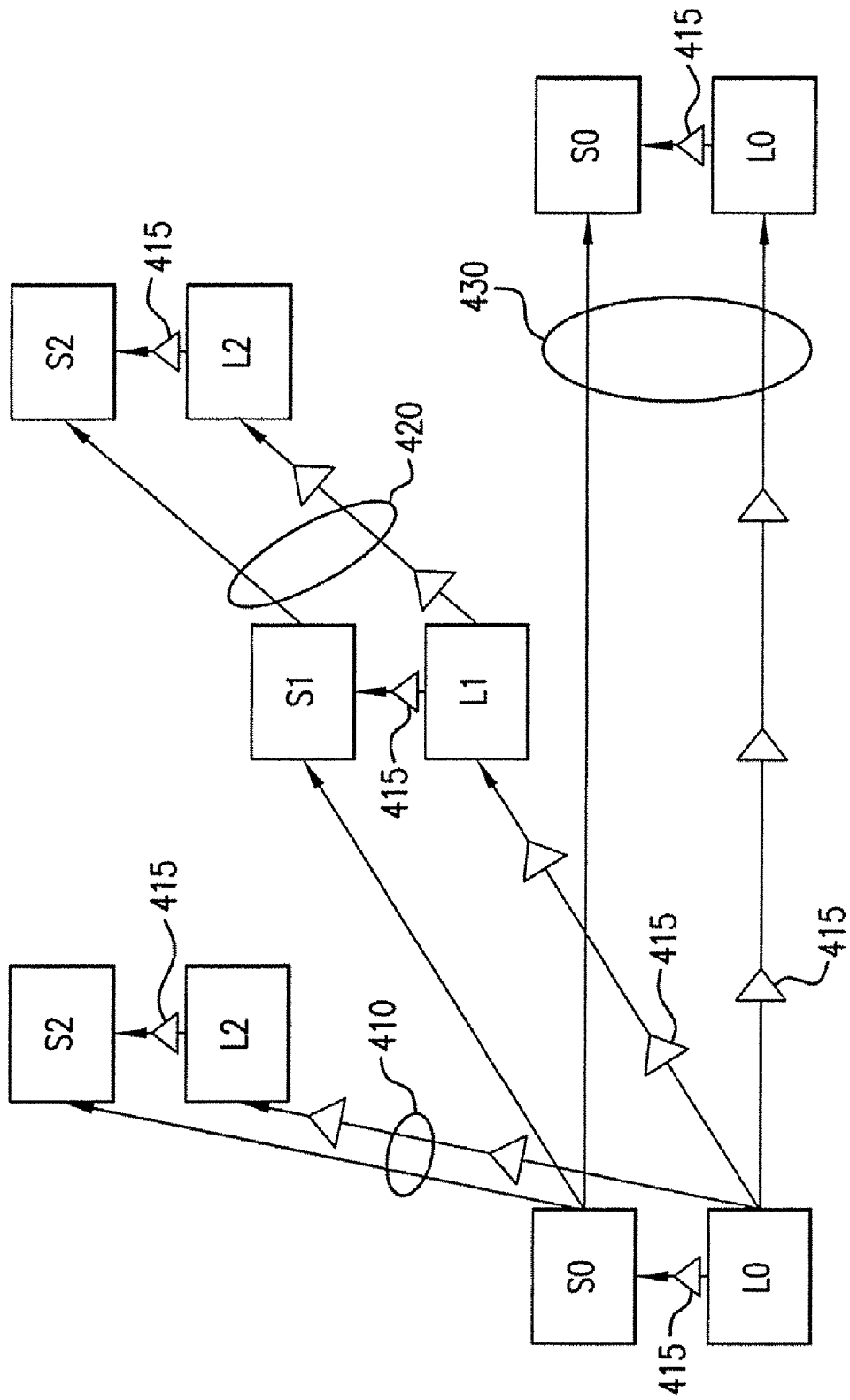
FIG. 4 is a block diagram illustrating an exemplary layered picture coding structure for the base, temporal enhancement, and SNR or spatial enhancement layers, in accordance with the principles of the present invention.
Figure 8:
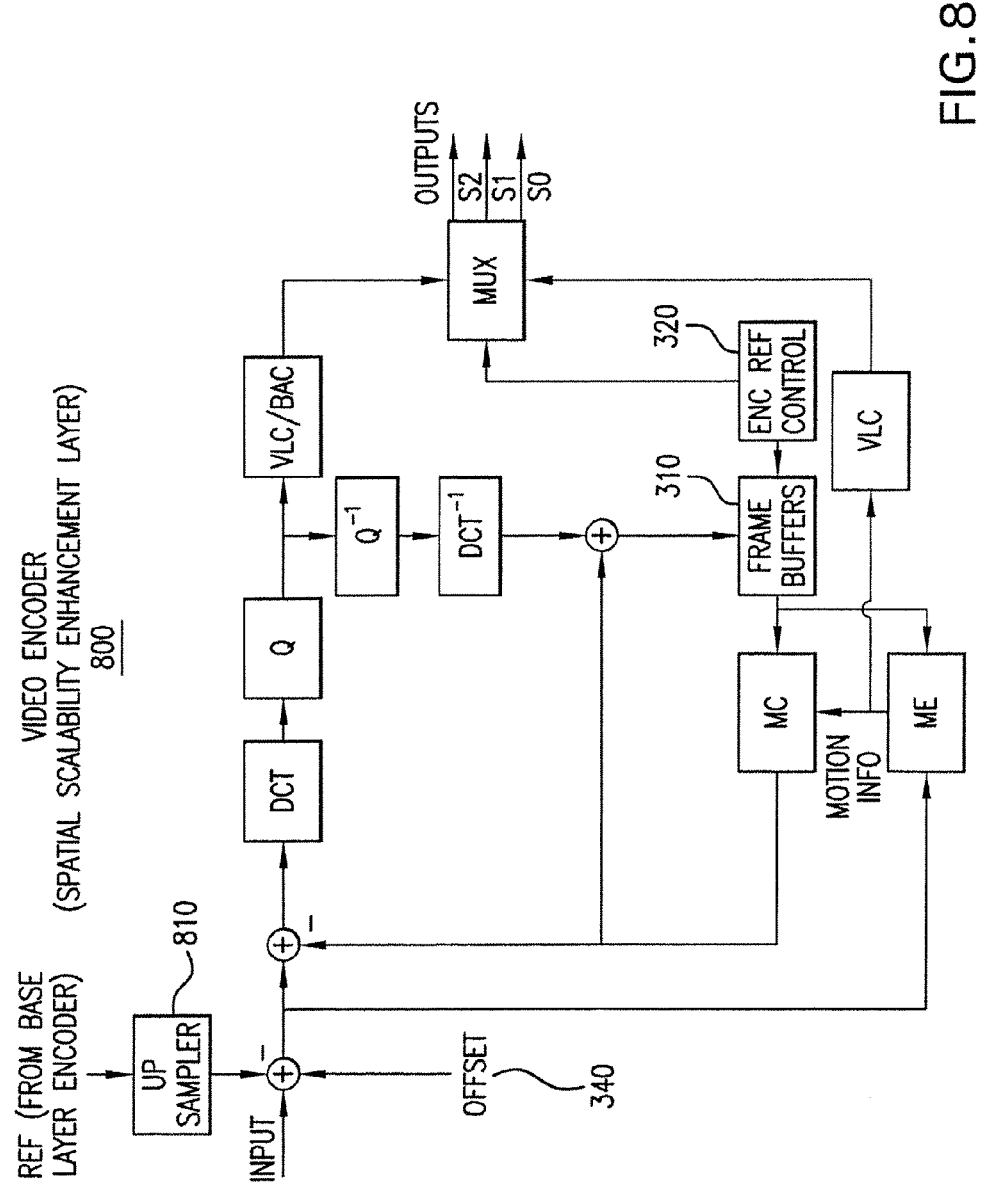
FIG. 8 is a block diagram illustrating an exemplary structure of a spatial scalability enhancement layer video encoder, in accordance with the principles of the present invention.
Figure 9:
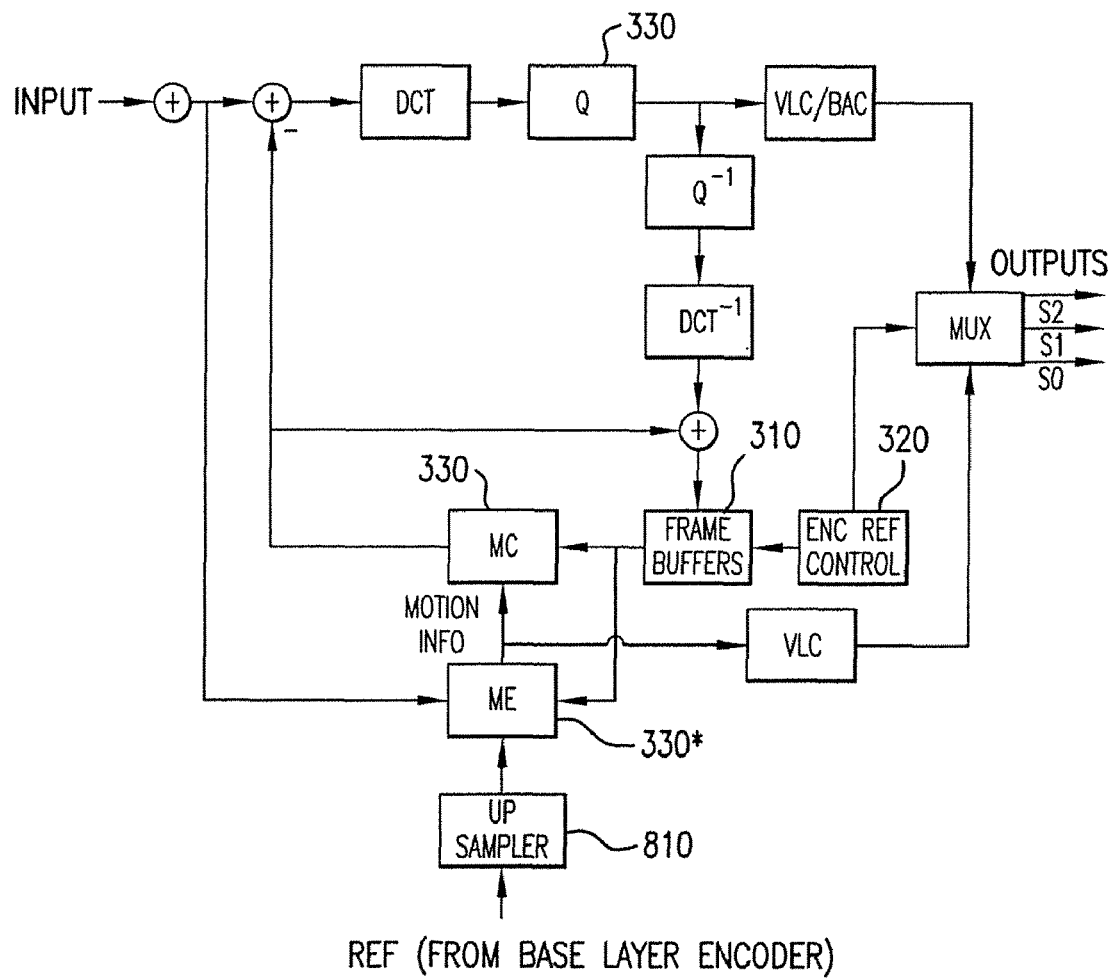
FIG. 9 is a block diagram illustrating an exemplary structure of a spatial scalability enhancement layer video encoder with inter-layer motion prediction, in accordance with the principles of the present invention.
Figure 10:
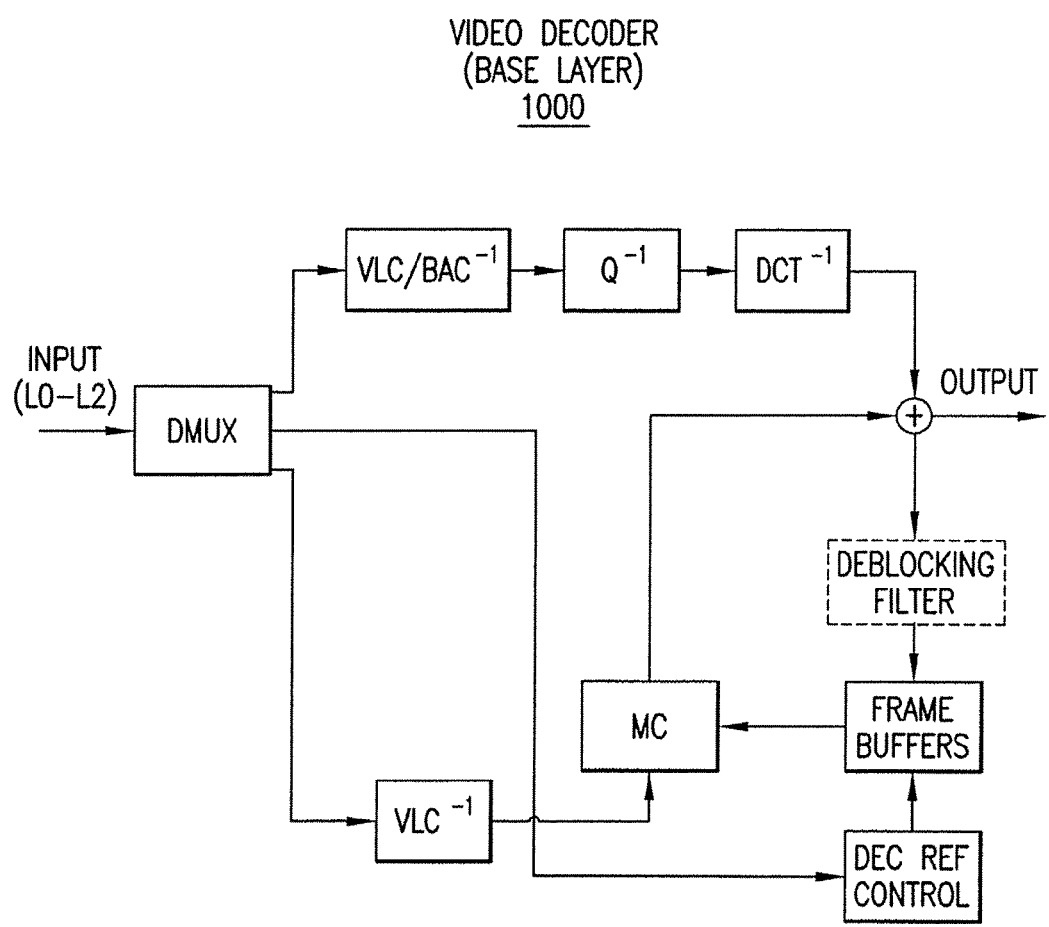
FIGS. 10 and 11 are block diagrams illustrating exemplary base layer and SNR enhancement layer video decoders, respectively, in accordance with the principles of the present invention.
Figure 11:
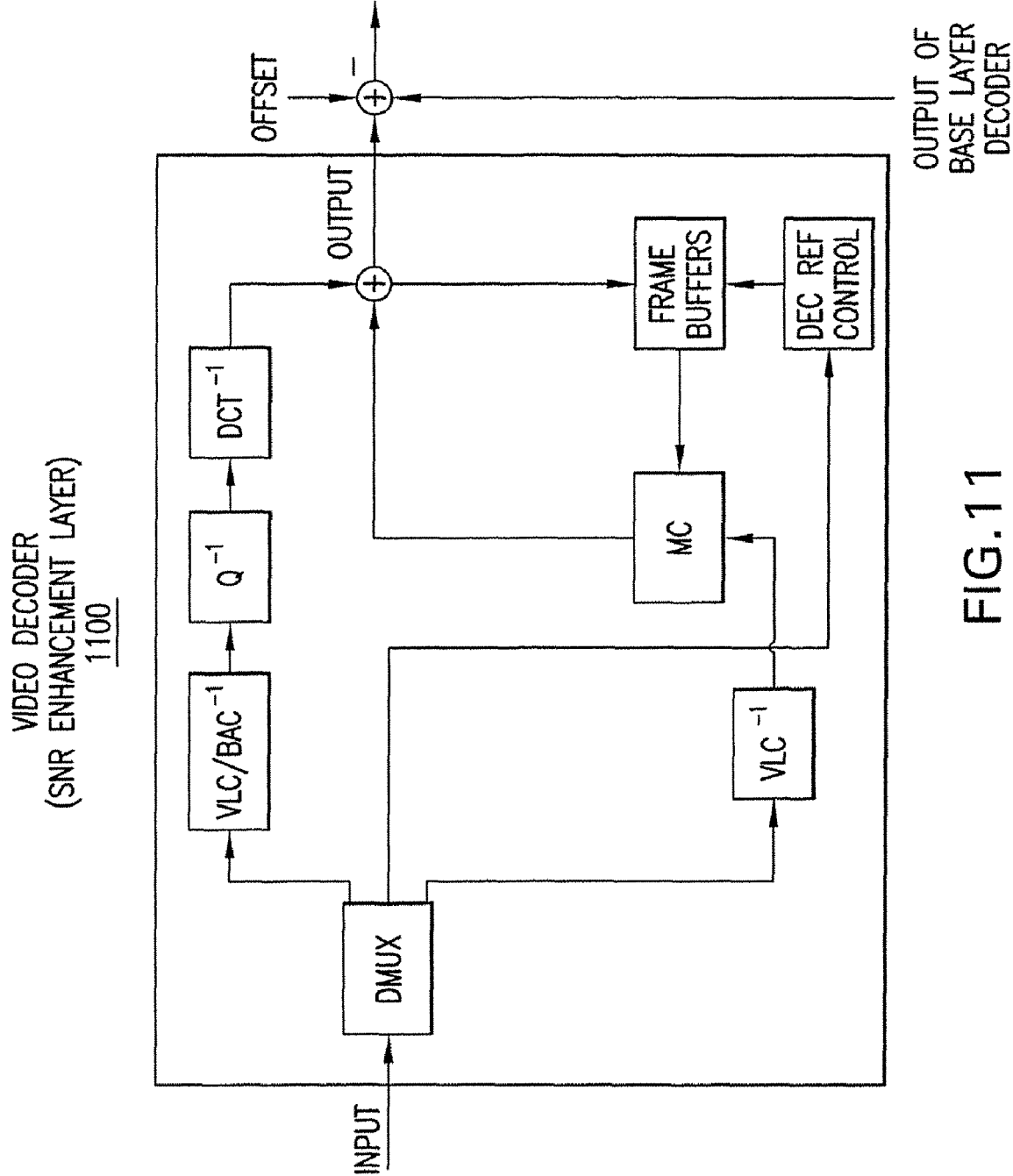
Figure 12:
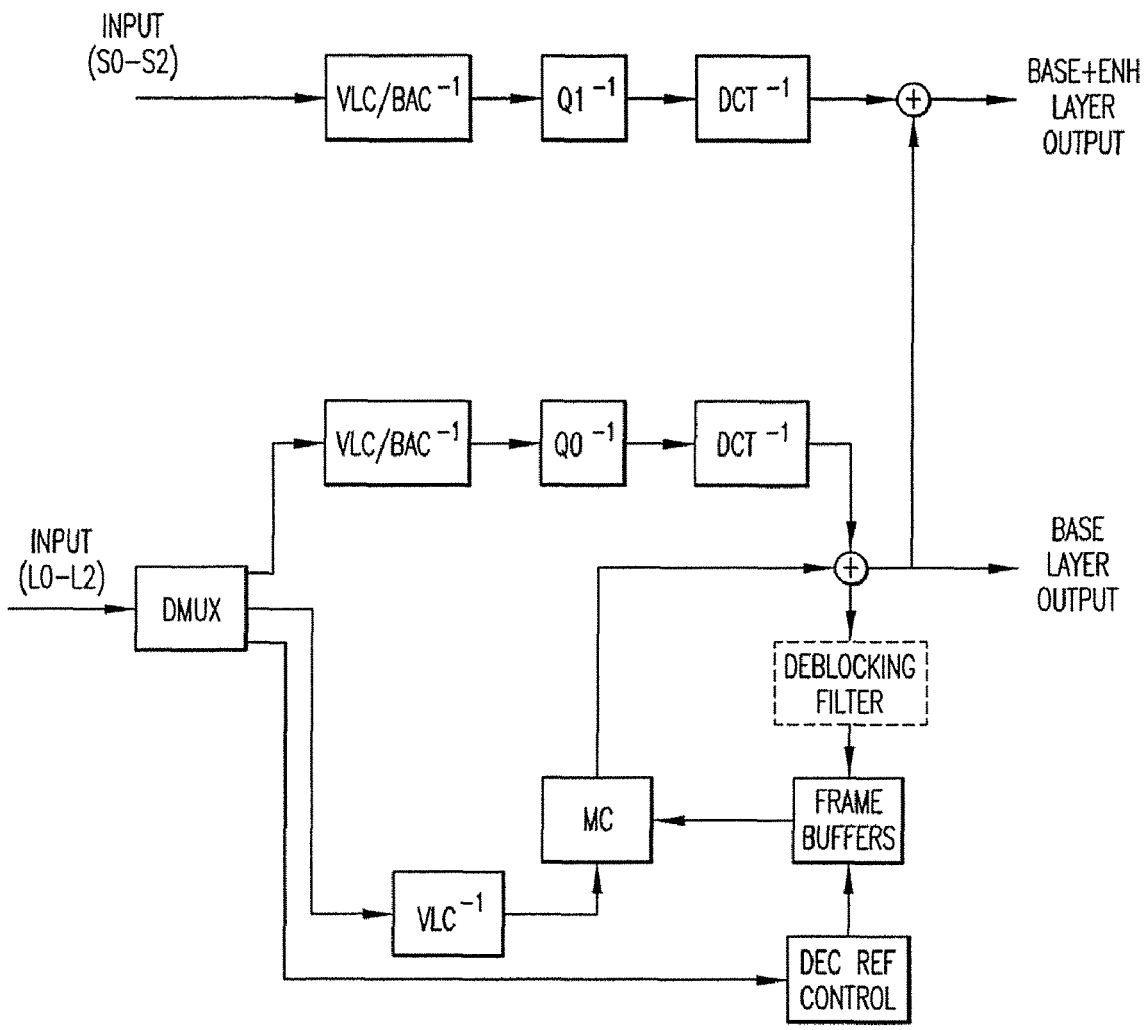
FIG. 12 is a block diagram illustrating an exemplary SNR enhancement layer, single-loop video decoder, in accordance with the principles of the present invention.
Figure 13:
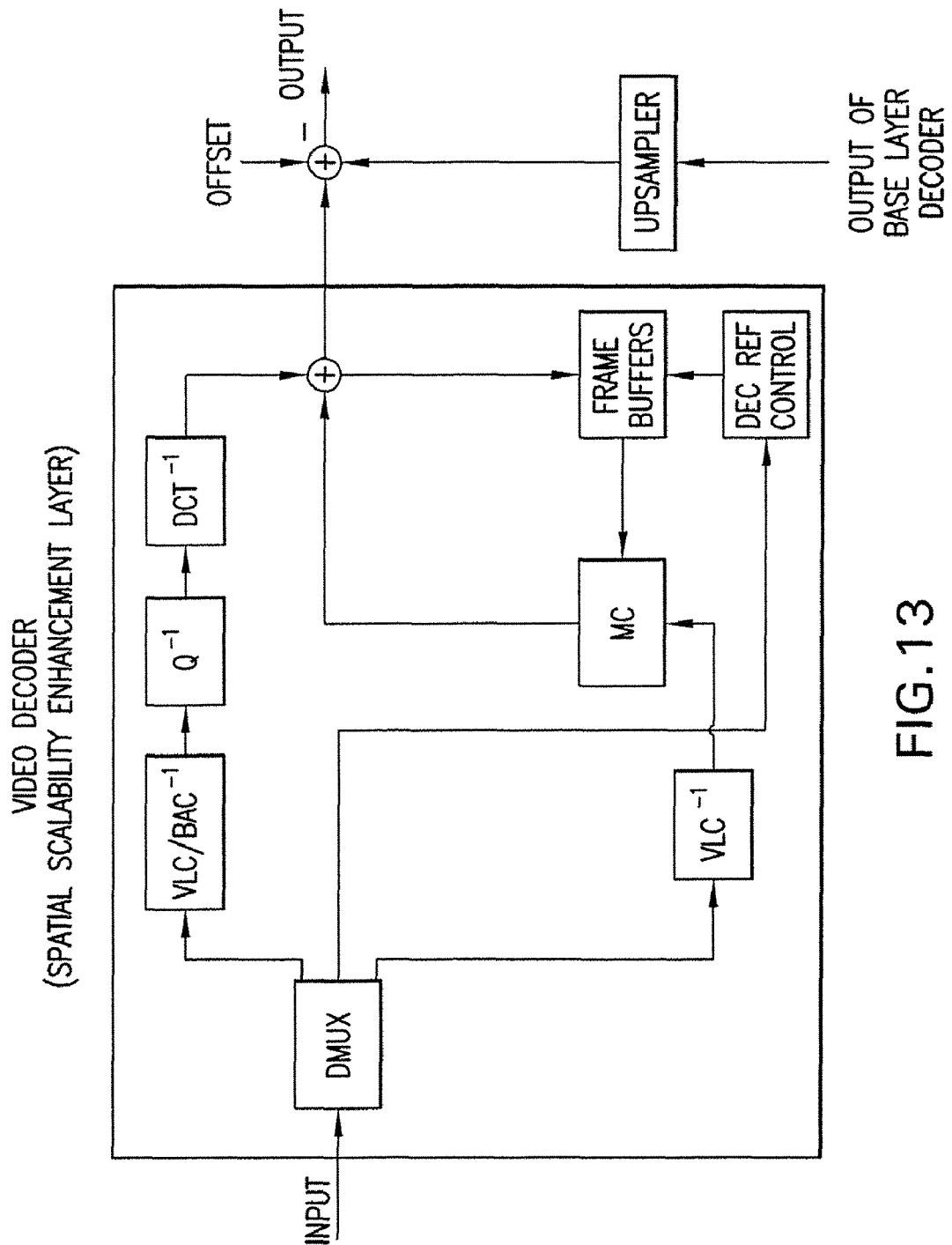
FIG. 13 is block diagram illustrating an exemplary spatial scalability enhancement layer video decoder, in accordance with the principles of the present invention.
Figure 14:
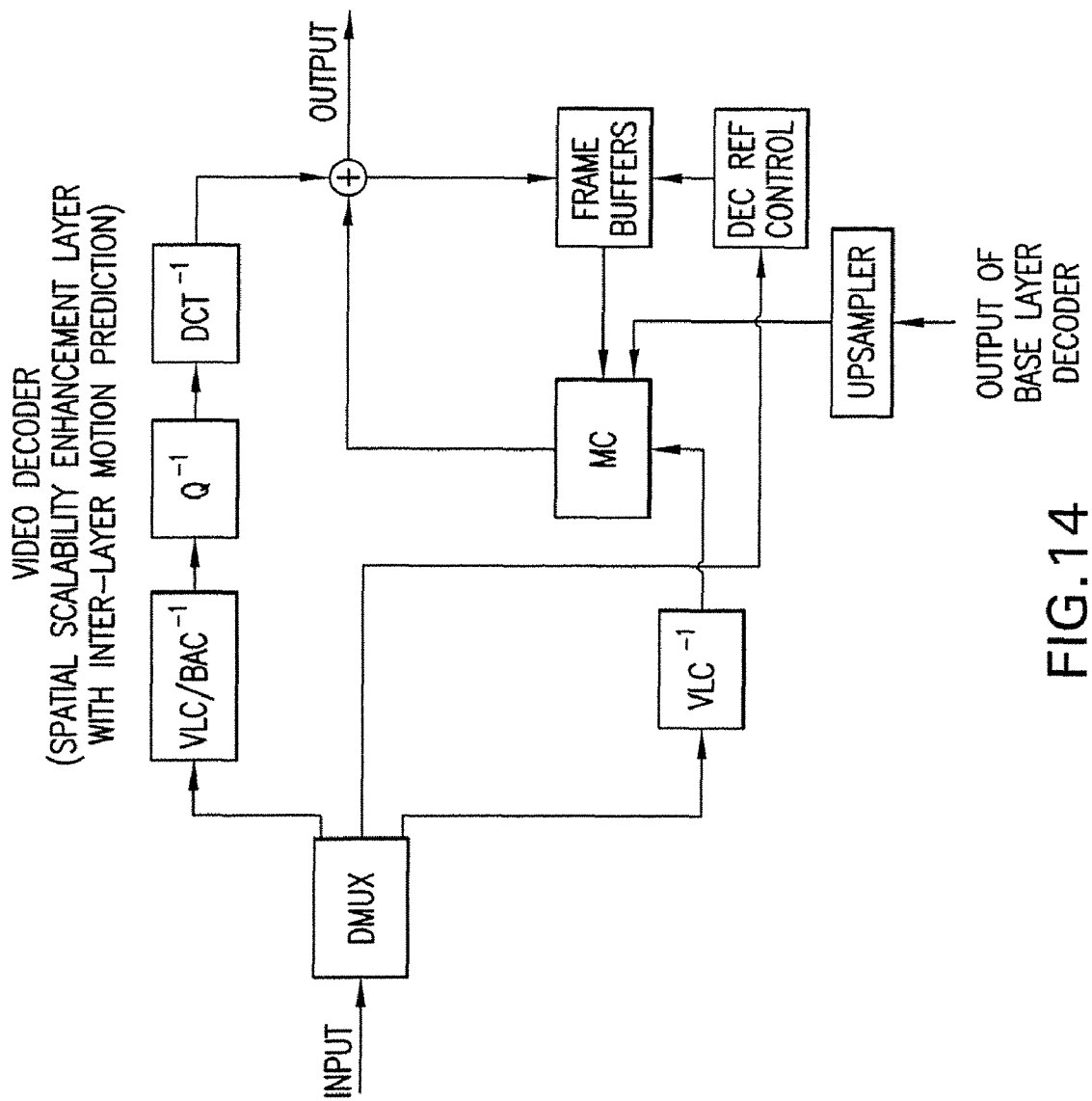
FIG. 14 is block diagram illustrating an exemplary video decoder for spatial scalability enhancement layers with inter-layer motion prediction, in accordance with the principles of the present invention.

The operation of ENC REF CONTROL block 310 is placed in context further with reference to an exemplary layered picture coding "threading" or "prediction chain" structure shown in FIG. 4. (FIGS. 8-9 show alternative threading structures). Codecs 300 utilized in implementations of the present invention may be configured to generate a set of separate picture "threads" (e.g., a set of three threads 410-430) in order to enable multiple levels of temporal scalability resolutions (e.g., L0-L2) and other enhancement resolutions (e.g., S0-S2). A thread or prediction chain is defined as a sequence of pictures that are motion-compensated using pictures either from the same thread, or pictures from a lower level thread. The arrows in FIG. 4 indicate the direction, source, and target of prediction for three threads 410-430. Threads 410-420 have a common source L0 but different targets and paths (e.g., targets L2, L2, and L0, respectively). The use of threads allows the implementation of temporal scalability, since any number of top-level threads can be eliminated without affecting the decoding process of the remaining threads.

It will be noted that in encoder 300, according to H.264, ENC REF CONTROL block may use only P pictures as reference pictures. However, B pictures also may be used with accompanying gains in overall compression efficiency. Using even a single B picture in the set of threads (e.g., by having L2 be coded as a B picture) can improve compression efficiency. In traditional interactive communications, the use of B pictures with prediction from future pictures increases the coding delay and is therefore avoided. However, the present invention allows the design of MCUs with practically zero processing delay. (See co-filed U.S. Patent Application No. PCT/US2006/028366). With such MCUs, it is possible to utilize B pictures and still operate with an end-to-end delay that is lower than state-of-the-art traditional systems.

In operation, encoder 300 output L0 is simply a set of P pictures spaced four pictures apart. Output L1 has the same frame rate as L0, but only prediction based on the previous L0 picture is allowed. Output L2 pictures are predicted from the most recent L0 or L1 picture. Output L0 provides one fourth (1:4) of the full temporal resolution, L1 doubles the L0 frame rate (1:2), and L2 doubles the L0+L1 frame rate (1:1). A lesser number (e.g., less than 3, L0-L2) or an additional number of layers may be similarly constructed by encoder 300 to accommodate different bandwidth/scalability requirements or different specifications of implementations of the present invention.

In accordance with the present invention, for additional scalability, each compressed temporal video layer (e.g., L0-L1) may include or be associated with one or more additional components related to SNR quality scalability and/or spatial scalability. FIG. 4 shows one additional enhancement layer (SNR or spatial). Note that this additional enhancement layer will have three different components (S0-S2), each corresponding to the three different temporal layers (L0-L2).

Figure 5:
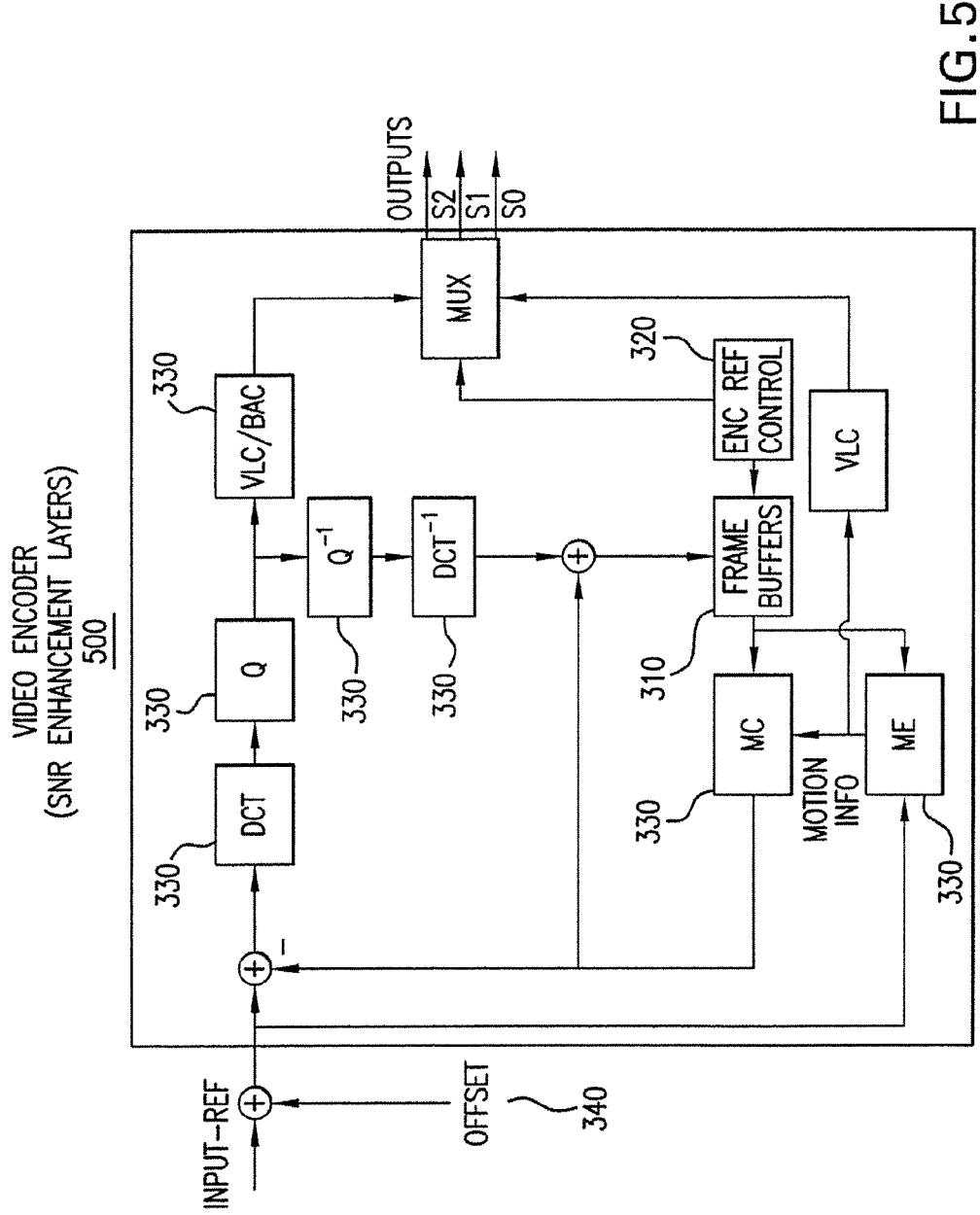
FIG. 5 is a block diagram illustrating the structure of an exemplary SNR enhancement layer encoder, in accordance with the principles of the present invention.
Figure 6:
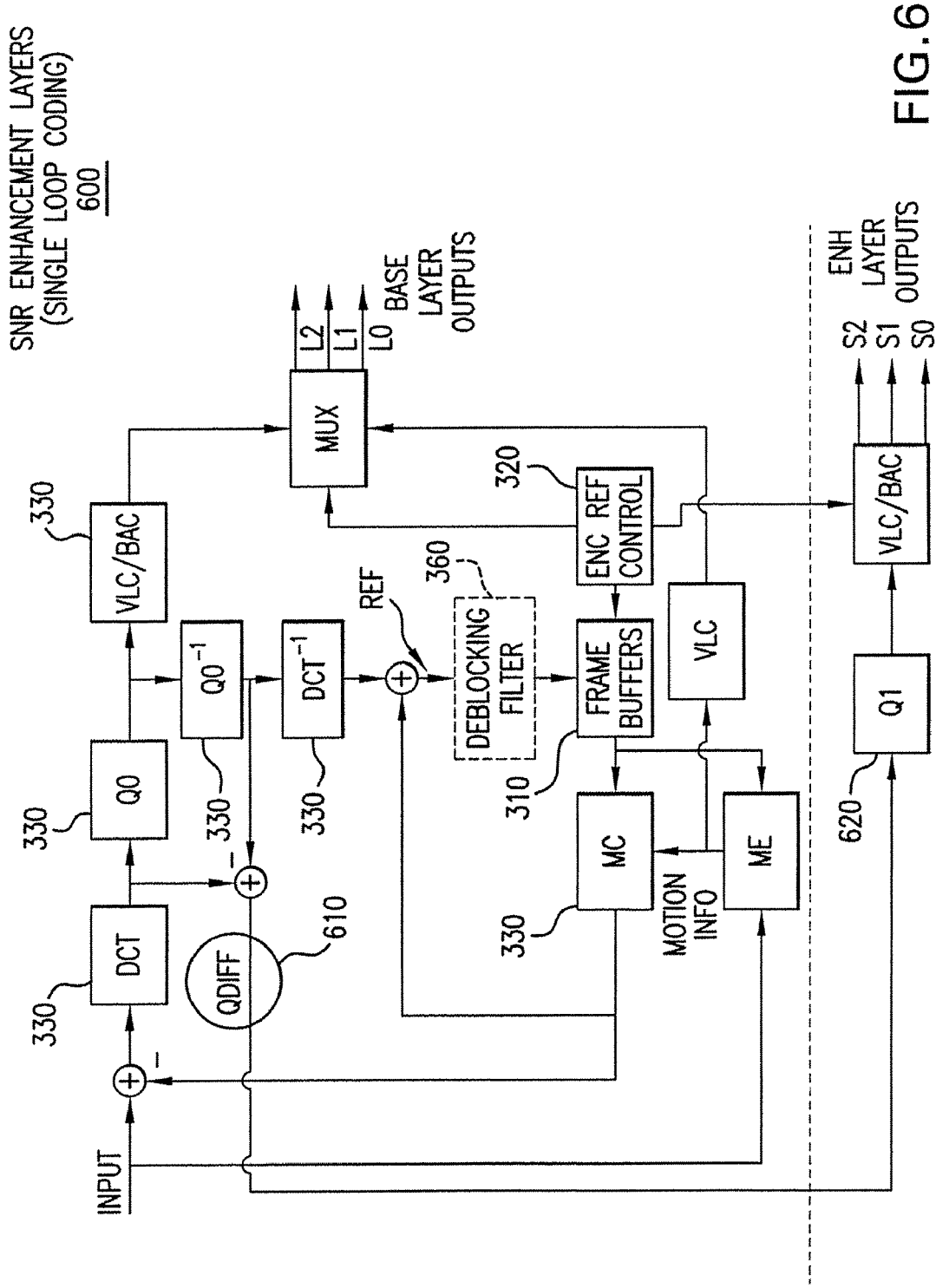
FIG. 6 is a block diagram illustrating the structure of an exemplary single-loop SNR video encoder, in accordance with the principles of the present invention.
Figure 7:
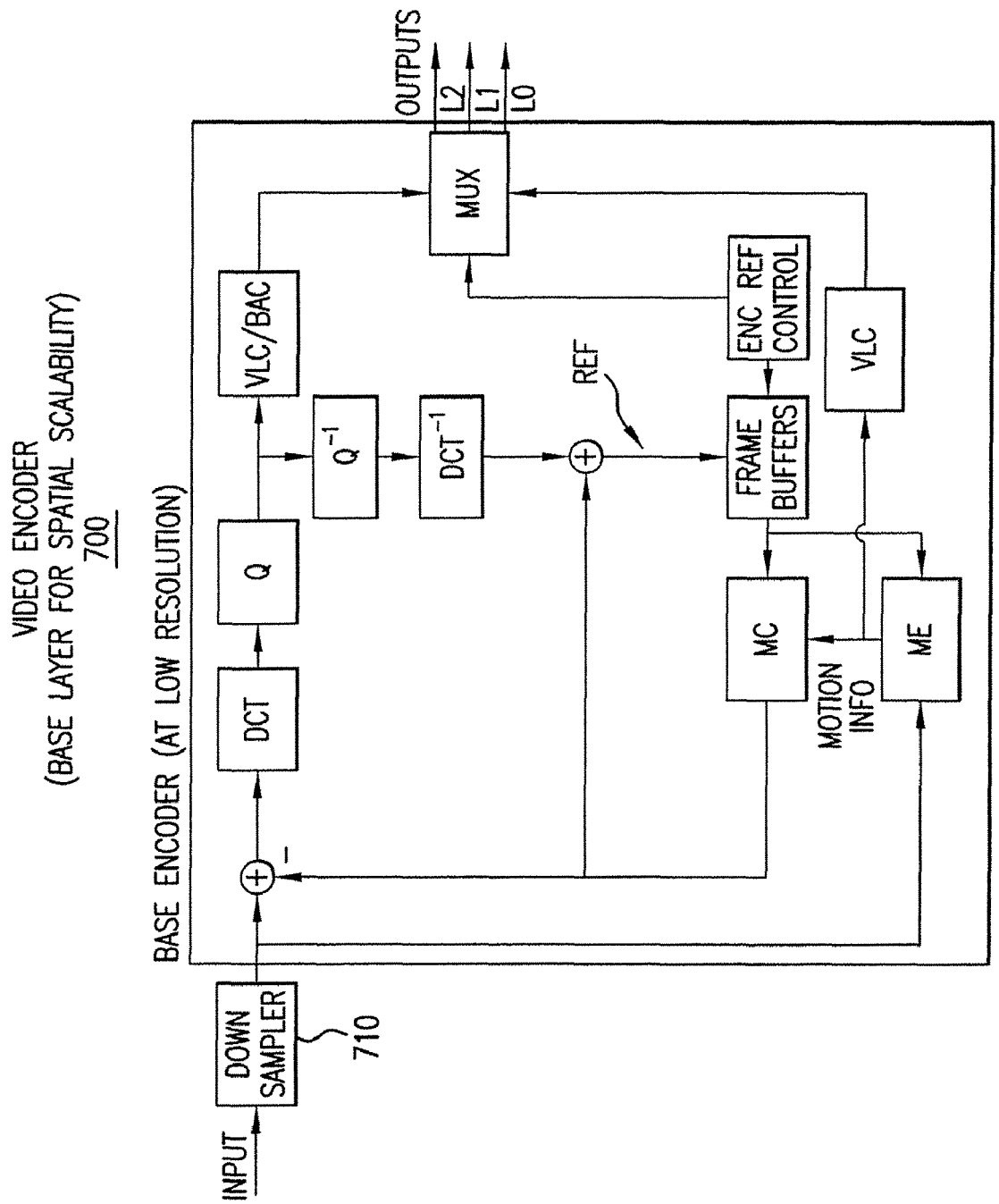
FIG. 7 is a block diagram illustrating an exemplary structure of a base layer for a spatial scalability video encoder, in accordance with the principles of the present invention.

FIGS. 5 and 6 show SNR scalability encoders 500 and 600, respectively. FIGS. 7-9 show spatial scalability encoders 700-900, respectively. It will be understood that SNR scalability encoders 500 and 600 and spatial scalability encoders 700-900 are based on and may use the same processing blocks (e.g., blocks 330, 310 and 320) as encoder 300 (FIG. 3).

It is recognized that for the base layer of an SNR scalable codes, the input to the base layer codec is a full resolution signal (FIGS. 5-6). In contrast, for the base layer of a spatial scalability codec, the input to the base layer codec is a downsampled version of the input signal FIGS. 7-9. It is also noted that the SNR/spatial quality enhancement layers S0-S2 may be coded according to the forthcoming ITU-T H.264 Annex F standard or other suitable technique.

FIG. 5 shows the structure of an exemplary SNR enhancement encoder 500, which is similar to the structure of layered encoder 300 based on H.264 shown in FIG. 3. It will, however, be noted that the input to the SNR enhancement layer coder 500 is the difference between the original picture (INPUT, FIG. 3) and the reconstructed coded picture (REF, FIG. 3) as recreated at the encoder.

FIG. 5 also shows use of encoder 500 based on H.264 for encoding the coding error of the previous layers. Non-negative inputs are required for such encoding. To ensure this, the input (INPUT-REF) to encoder 500 is offset by a positive bias (e.g., by OFFSET 340). The positive bias is removed after decoding and prior to the addition of the enhancement layer to the base layer. A deblocking filter that is typically used in H.264 codec implementations (e.g., Deblocking filter 360, FIG. 3) is not used in encoder 500. Further, to improve subjective coding efficiency, DC direct cosine transform (DCT) coefficients in the enhancement layer may be optionally ignored or eliminated in encoder 500. Experimental results indicate that the elimination of the DC values in an SNR enhancement layer (S0-S2) does not adversely impact picture quality, possibly due to the already fine quantization performed at the base layer. A benefit of this design is that the exactly same encoding/decoding hardware or software can be used both for the base and SNR enhancement layers. In a similar fashion—spatial scalability (at any ratio) may be introduced by applying the H.264 base layer coding to a downsampled image and upsampling the reconstructed image before calculating the residual. Further, standards other than H.264 can be used for compressing both layers.

In the codecs of the present invention, in order to decouple the SNR and temporal scalabilities, all motion prediction within a temporal layer and across temporal layers may be performed using the base layer streams only. This feature is shown in FIG. 4 by the open arrowheads 415 indicating temporal prediction in the base layer block (L) rather than in the combination of L and S blocks. For this feature, all layers may be coded at CIF resolutions. Then, QCIF resolution pictures may be derived by decoding the base layer stream having a certain temporal resolution, and downsampling in each spatial dimension by a dyadic factor (2), using appropriate low-pass filtering. In this manner, SNR scalability can be used to also provide spatial scalability. It will be understood that CIF/QCIF resolutions are referred to only for purposes of illustration. Other resolutions (e.g., VGA/QVGA) can be supported by the inventive codecs without any change in codec design. The codecs may also include traditional spatial scalability features in the same or similar manner as described above for the inclusion of the SNR scalability feature. Techniques provided by MPEG-2 or H.264 Annex F may be used for including traditional spatial scalability features.

The architecture of codecs designed to decouple the SNR and temporal scalabilities described above, allows frame rates in ratios of 1:4 (L0 only), 1:2 (L0 and L1), or 1:1 (all three layers). A 100% bitrate increase is assumed for doubling the frame rate (base is 50% of total), and a 150% increase for adding the S layer at its scalability point (base is 40% of total). In a preferred implementation, the total stream may, for example, operate at 500 Kbps, with the base layer operating at 200 Kbps. A rate load of 200/4=50 Kbps per frame may be assumed for the base layer, and (500-200)/4=75 Kbps for each frame. It will be understood that the aforementioned target bitrates and layer bitrate ratio values are exemplary and have been specified only for purposes of illustrating the features of the present invention, and that the inventive codecs can be easily adapted to other target bitrates, or layer bitrate ratios.

Theoretically, up to 1:10 scalability (total vs. base) is available when the total stream and the base layer operate at 500 Kbps and 200 Kbps, respectively. TABLE I shows examples of the different scalability options available when SNR scalability is used to provide spatial scalability.

TABLE I

| | Scalability Options | |
| --- | --- | --- |
| Temporal (fps) | QCIF* (Kbps) L only | CIF (Kbps) L to L + S |
| 7.5 (L0) | 50 | 50-125 |
| 15 (L0 + L1) | 100 | 100-250 |
| 30 (L0 + L1 + L2) | 200 | 200-500 |

*Although no QCIF component is present in the bitstreams, it can be provided by scaling down the CIF image by a factor of 2. In this example, the lower resolution of QCIF presumably allows this operation to be performed from the base CIF layer without noticeable effect on quality.

FIG. 6 shows alternate SNR scalable encoder 600, which is based on a single encoding loop scheme. The structure and operation of SNR scalable encoder 600 is based on that of encoder 300 (FIG. 3). Additionally in encoder 600, DCT coefficients that are quantized by Q0 are inverse-quantized and subtracted from the original unquantized coefficients to obtain the residual quantization error (QDIFF 610) of the DCT coefficients. The residual quantization error information (QDIFF 610) is further quantized with a finer quantizer Q1 (Block 620), entropy coded (VLC/BAC), and output as the SNR enhancement layer S. It is noted that there is a single coding loop in operation, i.e., the one operating at the base layer.

Terminal 140/video 230 encoders may be configured to provide spatial scalability enhancement layers in addition to or instead of the SNR quality enhancement layers. For encoding spatial scalability enhancement layers, the input to the encoder is the difference between the original high-resolution picture and the upsampled reconstructed coded picture as created at the encoder. The encoder operates on a downsampled version of the input signal. FIG. 7 shows exemplary encoder 700 for encoding the base layer for spatial scalability. Encoder 700 includes a downsampler 710 at the input of low-resolution base layer encoder 720. For a full resolution input signal at CIF resolution, base layer encoder 720 may with suitable downsampling operate at QCIF, HCIF (half CIF), or any other resolution lower than CIF. In an exemplary mode, base layer encoder 720 may operate at HCIF. HCIF-mode operation requires downsampling of a CIF resolution input signal by about a factor of $\sqrt{2}$ in each dimension, which reduces the total number of pixels in a picture by about one-half of the original input. It is noted that in a video conferencing application, if a QCIF resolution is desired for display purposes, then the decoded base layer will have to be further downsampled from HCIF to QCIF.

It is recognized that an inherent difficulty in optimizing the scalable video encoding process for video conferencing applications is that there are two or more resolutions of the video signal being transmitted. Improving the quality of one of the resolutions may result in corresponding degradation of the quality of the other resolution(s). This difficulty is particularly pronounced for spatially scalable coding, and in current art video conferencing systems in which the coded resolution and the display resolutions are identical. The inventive technique of decoupling the coded signal resolution from the intended display resolution provides yet another tool in a codec designer's arsenal to achieve a better balance between the quality and bitrates associated with each of the resolutions. According to the present invention, the choice of coded resolution for a particular codec may be obtained by considering the rate-distortion (R-D) performance of the codec across different spatial resolutions, taking into account the total bandwidth available, the desired bandwidth partition across the different resolutions, and the desired quality difference differential that each additional layer should provide.

Under such a scheme, a signal may be coded at CIF and one-third CIF (⅓CIF) resolutions. Both CIF and HCIF resolution signals may be derived for display from the CIF-coded signal. Further, both ⅓CIF and QCIF resolution signals may similarly be derived for display from the ⅓CIF-coded signal. The CIF and ⅓CIF resolution signals are available directly from the decoded signals, whereas the latter HCIF and QCIF resolution signals may be obtained upon appropriate downsampling of the decoded signals. Similar schemes may also be applied in the case of other target resolutions (e.g., VGA and one-third VGA, from which half VGA and quarter VGA can be derived).

The schemes of decoupling the coded signal resolution from the intended display resolution, together with the schemes for threading video signal layers (FIG. 4, and FIGS. 15 and 16), provide additional possibilities for obtaining target spatial resolutions with different bitrates, in accordance with the present invention. For example, in a video signal coding scheme, spatial scalability may be used to encode the source signal at CIF and ⅓CIF resolutions. SNR and temporal scalabilities may be applied to the video signal as shown in FIG. 4. Further, the SNR encoding used may be a single loop or a double loop encoder (e.g., encoder 600 FIG. 6 or encoder 500 FIG. 5), or may be obtained by data partitioning (DP). The double loop or DP encoding schemes will likely introduce drift whenever data is lost or removed. However, the use of the layering structure will limit the propagation of the drift error until the next L0 picture, as long as the lost or removed data belongs to the L1, L2, S1, or S2 layers. Further taking into account the fact that the perception of errors is reduced when the spatial resolution of the displayed video signal is reduced, it is possible to obtain a low bandwidth signal by eliminating or removing data from the L1, L2, S1, and S2 layers, decoding the ⅓CIF resolution, and displaying it downsampled at a QCIF resolution. The loss of data because of downsampling will cause errors in the corresponding L1/S1 and L2/S2 pictures, and will also propagate errors to future pictures (until the next L0 picture), but the fact that the display resolution is reduced makes the quality degradation less visible to a human observer. Similar schemes may be applied to the CIF signal, for display at HCIF, ⅔ CIF or at any other desired resolution. These schemes advantageously allow the use of quality scalability to effect spatial scalability at various resolutions, and at various bitrates.

FIG. 8 shows the structure of an exemplary spatially scalable enhancement layer encoder 800, which, like encoder 500, uses the same H.264 encoder structure for encoding the coding error of the previous layers but includes an upsampler block 810 on the reference (REF) signal. Since non-negative input is assumed for such an encoder, the input values are offset (e.g., by offset 340) prior to coding. Values that still remain negative are clipped to zero. The offset is removed after decoding and prior to the addition of the enhancement layer to the upsampled base layer.

For the spatial enhancement layer encoding, like for the SNR layer encoding (FIG. 6), it may be advantageous to use frequency weighting in the quantizers (Q) of the DCT coefficients. Specifically, coarser quantization can be used for the DC and its surrounding AC coefficients. For example, a doubling of the quantizer step size for the DC coefficient may be very effective.

FIG. 9 shows the exemplary structure of another spatially scalable video encoder 900. In encoder 900, unlike in encoder 800, the upsampled reconstructed base layer picture (REF) is not subtracted from the input, but instead serves as an additional possible reference picture in the motion estimation and mode selection blocks 330 of the enhancement layer encoder. Encoder 900 can accordingly be configured to predict the current full resolution picture either from a previous coded full resolution picture (or future picture, for B pictures), or an upsampled version of the same picture coded at the lower spatial resolution (inter-layer prediction). It should be noted that, whereas encoder 800 can be implemented using the same codec for the base and enhancement layers with only the addition of downsampler 710, upsampler 810, and offset 340 blocks, encoder 900 requires that the enhancement layer encoder's motion estimation (ME) block 330* is modified. It is also noted that enhancement layer encoder 900 operates on the regular pixel domain, rather than a differential domain.

It is also possible to combine the predictions from a previous high resolution picture and the upsampled base layer picture by using the B picture prediction logic of a standard single-layer encoder, such as an H.264 encoder. This can be accomplished by modifying the B picture prediction reference for the high resolution signal so that the first picture is the regular or standard prior high resolution picture, and the second picture is the upsampled version of the base layer picture. The encoder then performs prediction as if the second picture is a regular B picture, thus utilizing all the high-efficiency motion vector prediction and coding modes (e.g., spatial and temporal direct modes) of the encoder. Note that in H.264, "B" picture coding stands for 'bi-predictive' rather than 'bi-directional', in the sense that the two reference pictures could both be past or future pictures of the picture being coded, whereas in traditional 'bi-directional' B picture coding (e.g., MPEG-2) one of the two reference pictures is a past picture and the other is a future picture. This embodiment allows the use of a standard encoder design, with minimal changes that are limited to the picture reference control logic and the upsampling module.

In an implementation of the present invention, the SNR and spatial scalability encoding modes may be combined in one encoder. For such an implementation, video-threading structures (e.g., shown in two dimensions in FIG. 4) may be expanded in a third dimension, corresponding to the additional third scalability layer (SNR or spatial). An implementation in which SNR scalability is added on the full resolution signal of a spatially scalable codec may be attractive in terms of range of available qualities and bitrates.

FIGS. 10-14 show exemplary architectures for a base layer decoder 1000, SNR enhancement layer decoder 1100, a single-loop SNR enhancement layer decoder 1200, a spatially scalable enhancement layer decoder 1300 and spatially scalable enhancement layer decoder 1400 with interlayer motion prediction, respectively. These decoders complement encoders 300, 500, 600, 700, 800 and 900. Decoders 1000, 1100, 1200, 1300, and 1400 may be included in terminal 140 decoders 230A as appropriate or needed.

The scale video coding/decoding configurations of terminal 140 present a number of options for transmitting the resultant layers over the HRC and LRC in system 100. For example, (L0 and S0) layers or (L0, S0 and L1) layers may be transmitted over HRC. Alternate combinations also may be used as desired, upon due consideration of network conditions, and the bandwidths of high and low reliability channels. For example, depending on network conditions, it may be desirable to code S0 intra-mode but not to transmit S0 in a protected HRC. In such case, the frequency of intra-mode coding, which does not involve prediction, may depend on network conditions or may be determined in response to losses reported by a receiving endpoint. The S0 prediction chain may be refreshed in this manner (i.e. if there was an error at the S0 level, any drift is eliminated).

Figure 15:
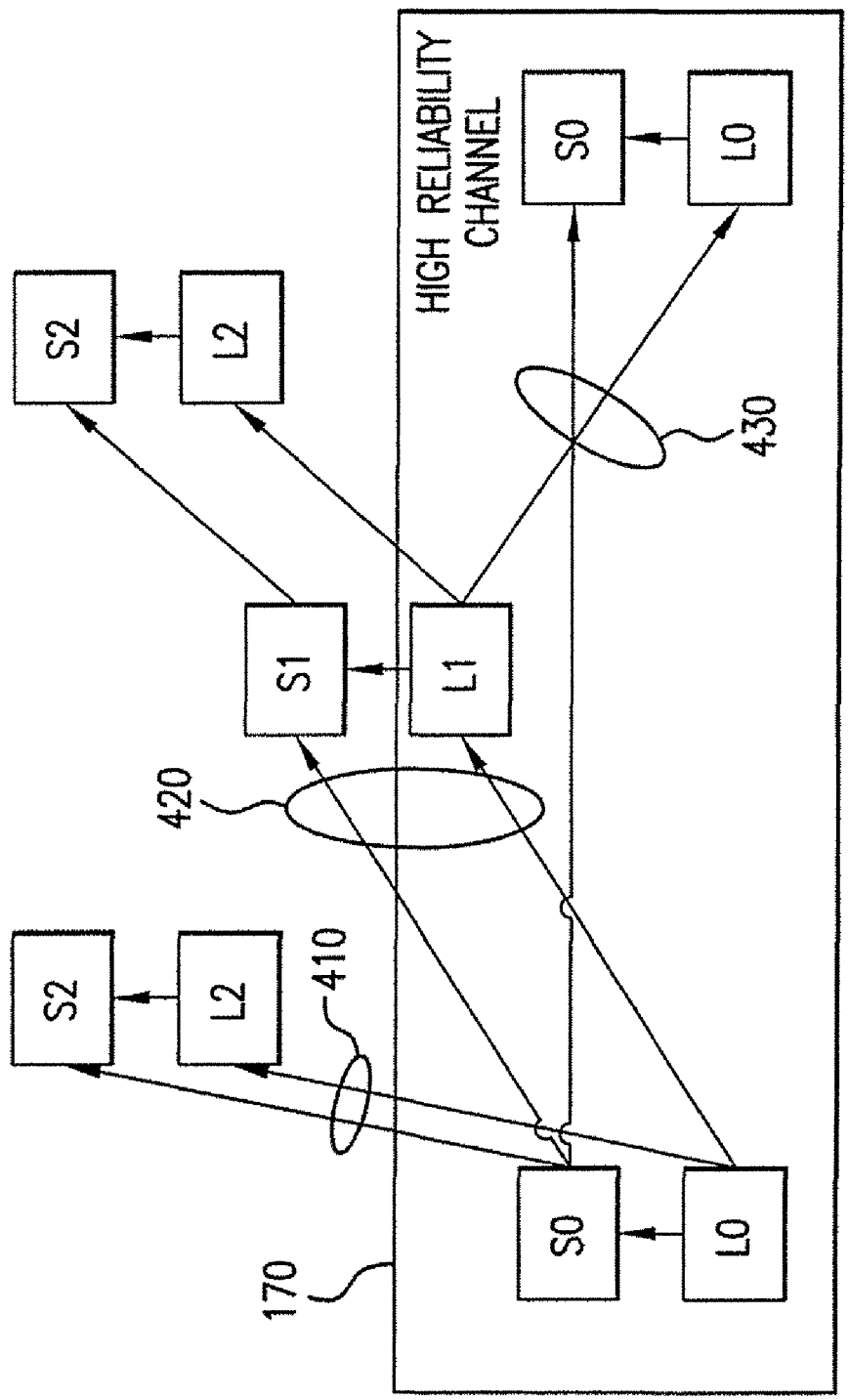
FIGS. 15 and 16 are block diagrams illustrating exemplary alternative layered picture coding structures and threading architectures, in accordance with the principles of the present invention.
Figure 16:
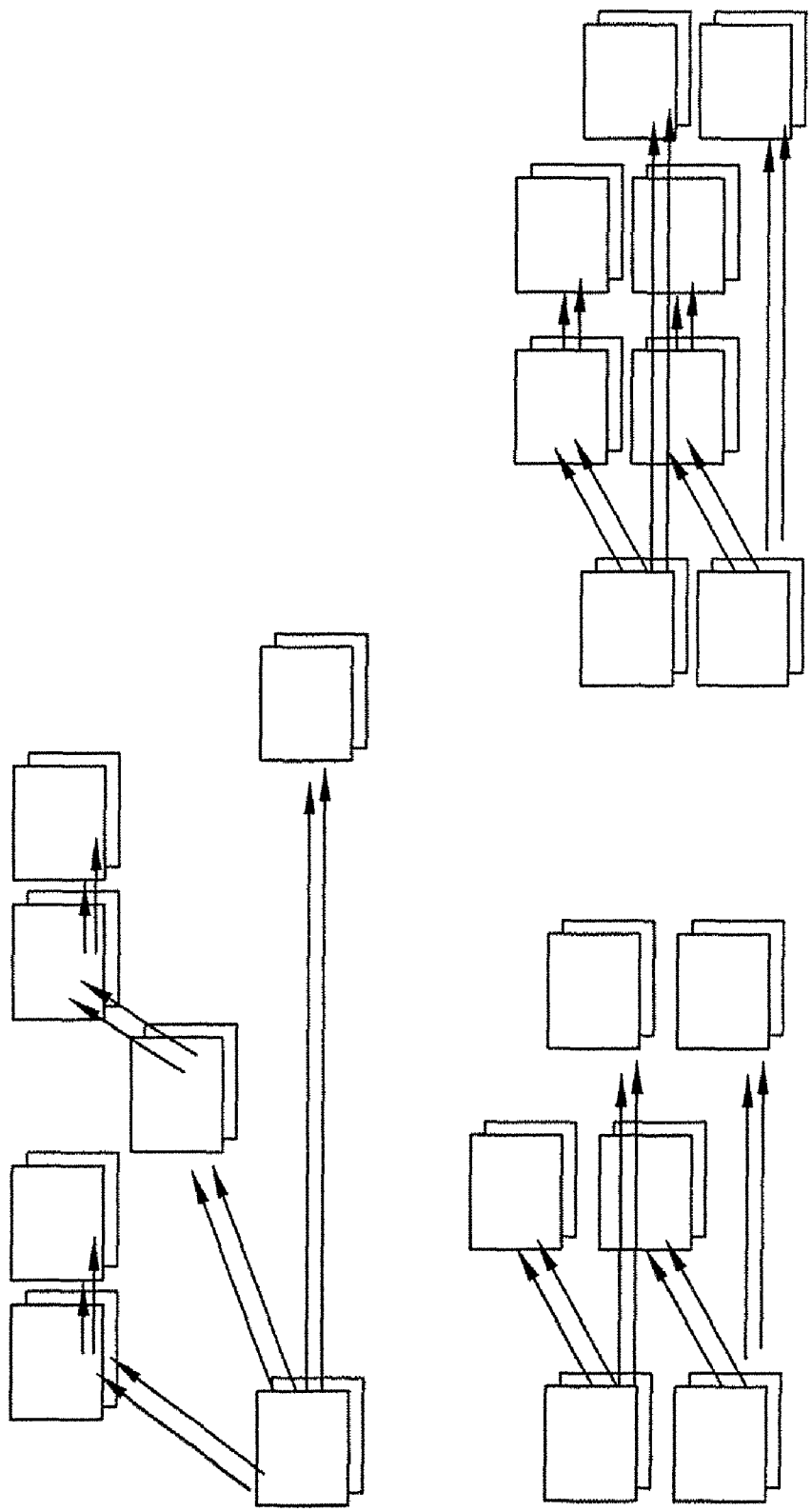

FIGS. 15 and 16 show alternative threading or prediction chain architectures 1500 and 1600, which may be used in video communication or conferencing applications, in accordance with the present invention. Implementations of threading structures or prediction chains 1500 and 1600 do not require any substantial changes to the codec designs described above with reference to FIGS. 2-14.

In architecture 1500, an exemplary combination of layers (S0, L0, and L1) is transmitted over high reliability channel 170. It is noted that, as shown, L1 is part of the L0 prediction chain 430, but not for S1. Architecture 1600 shows further examples of threading configurations, which also can achieve non-dyadic frame rate resolutions.

System 100 and terminal 140 codec designs described above are flexible and can be readily extended to incorporate alternative SVC schemes. For example, coding of the S layer may be accomplished according to the forthcoming ITU-T H.264 SVC FGS specification. When FGS is used, the S layer coding may be able to utilize arbitrary portions of a 'S' packet due to the embedded property of the produced bitstream. It may be possible to use portions of the FGS component to create the reference picture for the higher layers. Loss of the FGS component information in transmission over the communications network may introduce drift in the decoder. However, the threading architecture employed in the present invention advantageously minimizes the effects of such loss. Error propagation may be limited to a small number of frames in a manner that is not noticeable to viewers. The amount of FGS to include for reference picture creation may change dynamically.

A proposed feature of the H.264 SVC FGS specification is a leaky prediction technique in the FGS layer. See Y. Bao et al., "FGS for Low Delay," Joint Video Team (JVT) of ISO/IEC MPEG & ITU-T VCEG, 15$^{th}$ meeting, Busan, Korea, 18-22 Apr., 2005. The leaky prediction technique consists of using a normalized weighted average of the previous FGS enhancement layer picture and the current base layer picture. The weighted average is controlled by a weight parameter alpha; if alpha is 1 then only the current base layer picture is used, whereas if it is 0 then only the previous FGS enhancement layer picture is used. The case where alpha is 0 is identical to the use of motion estimation (ME 330, FIG. 5) for the SNR enhancement layer of the present invention, in the limiting case of using only zero motion vectors. The leaky prediction technique can be used in conjunction with regular ME as described in this invention. Further, it is possible to periodically switch the alpha value to 0, in order to break the prediction loop in the FGS layer and eliminate error drift.

Figure 17:
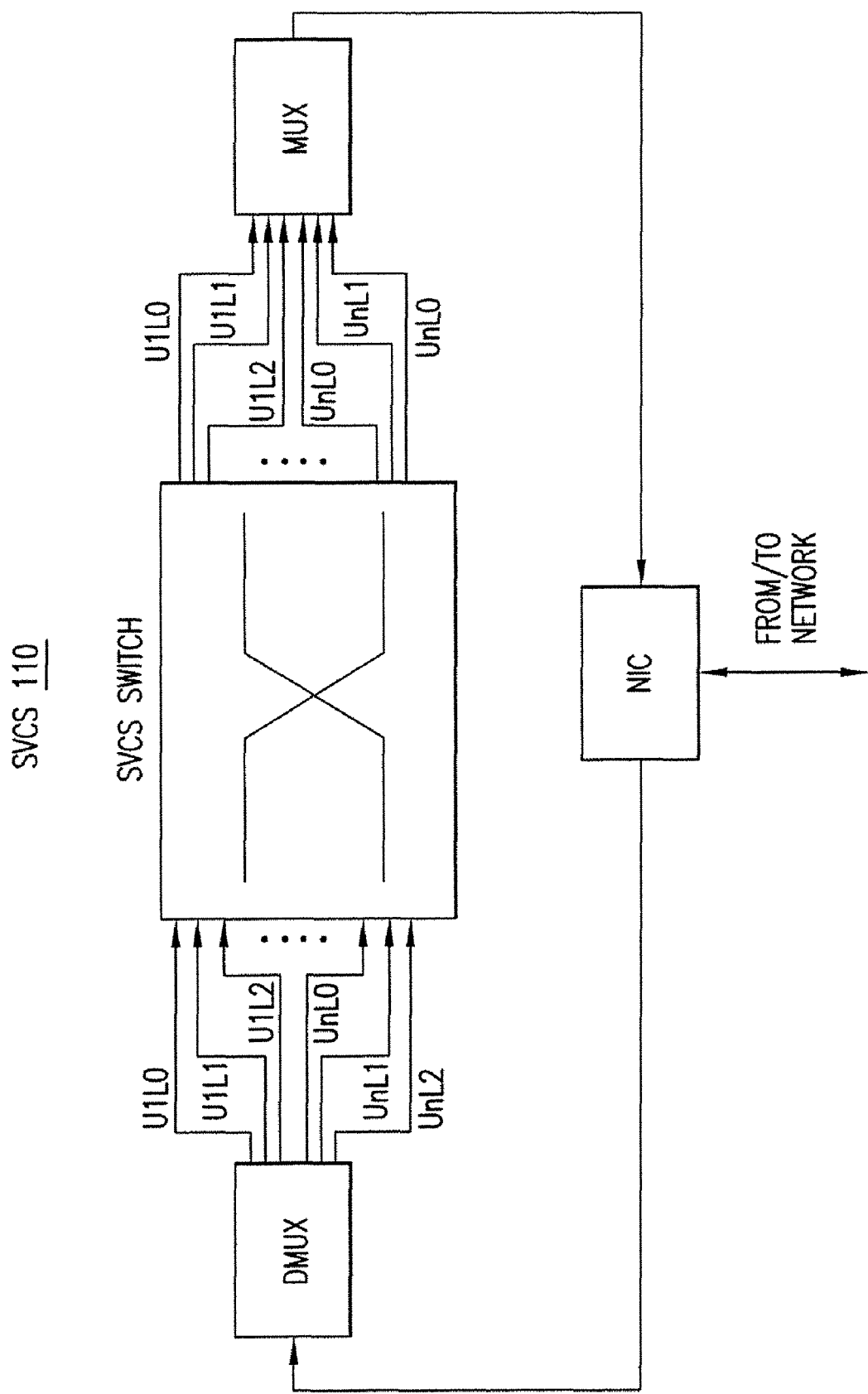
FIG. 17 is a block diagram illustrating an exemplary Scalable Video Coding Server (SVCS), in accordance with the principles of the present invention.

FIG. 17 shows the switch structure of an exemplary MCU/SVCS 110 that is used in videoconferencing system 100 (FIG. 1). MCU/SVCS 110 determines which packet from each of the possible sources (e.g., endpoints 120-140) is transmitted to which destination and over which channel (high reliability vs. low reliability) and switches signals accordingly. The designs and the switching functions MCU/SVCS 110 are described in co-filed International Application PCT/US2006/028366, incorporated by reference herein. For brevity, only limited details of the switch structure and switching functions of MCU/SVCS 110 are described further herein.

Figure 18:
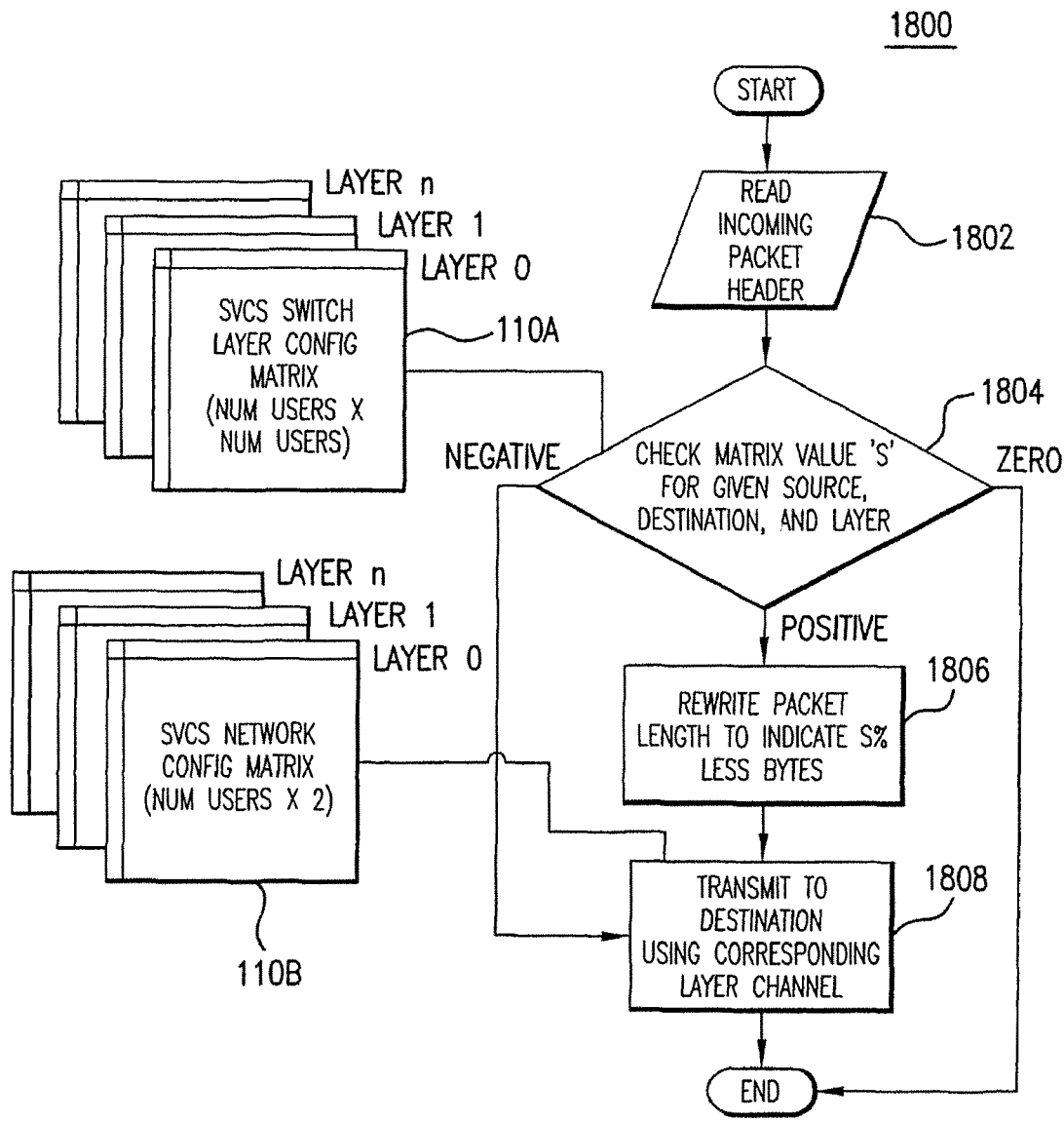
FIG. 18 is a schematic diagram illustrating the operation of an SVCS switch, in accordance with the principles of the present invention.

FIG. 18 shows the operation of an exemplary embodiment of MCU/SVCS switch 110. MCU/SVCS switch 110 maintains two data structures in its memory—an SVCS Switch Layer Configuration Matrix 110A and an SVCS Network Configuration Matrix 110, examples of which are shown in FIGS. 19 and 20, respectively. SVCS Switch Layer Configuration Matrix 110A (FIG. 19) provides information on how a particular data packet should be handled for each layer and for each pair of source and destination endpoints 120-140. For example, a matrix 110A element value of zero indicates that the packet should not be transmitted; a negative matrix element value indicates that the entire packet should be transmitted; and a positive matrix element value indicates that only the specified percentage of the packet's data should be transmitted. Transmission of a specified percentage of the packet's data may be relevant only when an FGS-type of technique is used to scalably code signals.

FIG. 18 also shows an algorithm 1800 in MCU/SVCS 110 for directing data packets utilizing Switch Layer Configuration Matrix 110A information. At step 1802, MCU/SVCS 110 may examine received packet headers (e.g., NAL headers, assuming use of H.264). At step 1804, MCU/SVCS 110 evaluates the value of relevant matrix 110A elements for source, destination, and layer combinations to establish processing instructions and designated destinations for the received packets. In applications using FGS coding, positive matrix element values indicate that the packet's payload must be reduced in size. Accordingly, at step 1806, the relevant length entry of the packet is changed and no data is copied. At step 1808, the relevant layers or combination of layers are switched to their designated destinations.

With reference to FIGS. 18 and 20, SVCS Network Configuration Matrix 110B tracks the port numbers for each participating endpoint. MCU/SVCS 110 may use Matrix 110B information to transmit and receive data for each of the layers.

The operation of MCU/SVCS 110 based on processing Matrices 110A and 110B allows signal switching to occur with zero or minimal internal algorithmic delay, in contrast to traditional MCU operations. Traditional MCUs have to compose incoming video to a new frame for transmission to the various participants. This composition requires full decoding of the incoming streams and recoding of the output stream. The decoding/recoding processing delay in such MCUs is significant, as is the computational power required. By using scalable bitstream architecture, and providing multiple instances of decoders 230A in each endpoint terminal 140 receiver, MCU/SVCS 110 is required only to filter incoming packets to select the appropriate layer(s) for each recipient destination. The fact that no or minimal DSP processing is required can advantageously allow MCU/SVCS 110 to be implemented with very little cost, offer excellent scalability (in terms of numbers of sessions that can be hosted simultaneously on a given device), and with end-to-end delays which may be only slightly larger than the delays in a direct endpoint-to-endpoint connection.

Terminal 140 and MCU/SVCS 100 may be deployed in different network scenarios using different bitrates and stream combinations. TABLE II shows the possible bitrates and stream combinations in various exemplary network scenarios. It is noted that base bandwidth/total bandwidth >=50% is the limit of DiffServ layering effectiveness, and further a temporal resolution of less than 15 fps is not useful.

TABLE II

Bitstream Components for Various Network Scenarios

|  | HRC | LRC | Total line speed | HRC vs. LRC bandwidth |
|---|---|---|---|---|
| Client transmits | L0 + L1 = 100 | S0 + S1 + L2 + S2 = 150 + 100 + 150 = 400 | 500 | 1:4 |
| SVCS reflects for CIF recipient | Same | Same | 500 | 1:4 |
| SVCS for lower speed client 1 | L0 + L1 = 100 | S0 + ½ × (S1 + S2) + L2 = 150 + 100 = 250 | 350 | 1:2.5 |
| SVCS for lower speed client 2 QCIF view at 30 fps | L0 + L1 = 100 | L2 = 100 | 200 | 1:1 |
| SVCS for lower speed client 3 CIF view at 15 fps | L0 = 50 | L1 + S0 + S1 = 50 + 150 | 200 | 1:1 |
| SVCS for lower speed client 4 QCIF at 15 fps | L0 = 50 | L1 = 50 | 100 | 1:1 |
| SVCS for very low speed client CIF 7.5 fps | L0 = 50 | S0 = 50 | 100 | 1:1 |

Terminal 140 and like configurations of the present invention allow scalable coding techniques to be exploited in the context of point-to-point and multi-point videoconferencing systems deployed over channels that can provide different QoS guarantees. The selection of the scalable codecs described herein, the selection of a threading model, the choice of which layers to transmit over the high reliability or low reliability channel, and the selection of appropriate bitrates (or quantizer step sizes) for the various layers are relevant design parameters, which may vary with particular implementations of the present invention. Typically, such design choices may be made once and the parameters remain constant during the deployment of a videoconferencing system, or at least during a particular videoconferencing session. However, it will be understood that SVC configurations of the present invention offer the flexibility to dynamically adjust these parameters within a single videoconferencing session. Dynamic adjustment of the parameters may be desirable, taking into account a participant's/endpoint's requirements (e.g., which other participants should be received, at what resolutions, etc.) and network conditions (e.g., loss rates, jitter, bandwidth availability for each participant, bandwidth partitioning between high and low reliability channels, etc.). Under suitable dynamic adjustment schemes, individual participants/endpoints may interactively be able to switch between different threading patterns (e.g., between the threading patterns shown in FIGS. 4, 8, and 9), elect to change how layers are assigned to the high and low reliability channels, elect to eliminate one or more layers, or change the bitrate of individual layers. Similarly, MCU/SVCS 110 may be configured to change how layers are assigned to the high and low reliability channels linking various participants, eliminate one or more layers, scale the FGS/SNR enhancement layer or some participants.

In an exemplary scenario, a videoconference may have three participants, A, B, and C. Participants A and B may have access to a high-speed 500 Kbps channel that can guarantee a continuous rate of 200 Kbps. Participant C may have access to a 200 Kbps channel that can guarantee 100 Kbps. Participant A may use a coding scheme that has the following layers: a base layer ("Base"), a temporal scalability layer ("Temporal") that provides 7.5 fps, 15 fps, 30 fps video at CIF resolutions, and an SNR enhancement layer ("FPS") that allows increase of the spatial resolution at either of the three temporal frame rates. The Base and Temporal components each require 100 Kbps, and FGS requires 300 Kbps for a total of 500 Kbps bandwidth. Participant A can transmit all three Base, Temporal, and FPS components to MCU 110. Similarly, participant B can receive all three components. However, since only 200 Kbps are guaranteed to participant B in the scenario, FGS is transmitted through the non-guaranteed 300 Kbps channel segment. Participant C can receive only the Base and Temporal components with the Base component guaranteed at 100 Kbps. If the available bandwidth (either guaranteed or total) changes, then Participant A's encoder (e.g., Terminal 140) can in response dynamically change the target bitrate for any of the components. For example, if the guaranteed bandwidth is more than 200 Kbps, more bits may be allocated to the Base and Temporal components. Such changes can be implemented dynamically in real-time response since encoding occurs in real-time (i.e., the video is not pre-coded).

If both participants B and C are linked by channels with restricted capacity, e.g., 100 Kbps, then participant A may elect to only transmit the Base component. Similarly, if participants B and C select to view received video only at QCIF resolution, participant A can respond by not transmitting the FGS component since the additional quality enhancement offered by the FGS component will be lost by downsampling of the received CIF video to QCIF resolution.

It will be noted that in some scenarios, it may be appropriate to transmit a single-layer video stream (base layer or total video) and to completely avoid the use of scalability layers.

In transmitting scalable video layers over HRCs and LRCs, whenever information on the LRCs is lost, only the information transmitted on the HRC may be used for video reconstruction and display. In practice, some portions of the displayed video picture will include data produced by decoding the base layer and designated enhancement layers, but other portions will include data produced by decoding only the base layer. If the quality levels associated with the different base layer and enhancement layer combinations are significantly different, then the quality differences between the displayed video picture that include or do not include lost LRC data may become noticeable. The visual effect may be more pronounced in the temporal dimension, where repeated changes of the displayed picture from base layer to 'base plus enhancement layer' may be perceived as flickering. To mitigate this effect, it may be desirable to ensure that the quality difference (e.g., in terms of PSNR) between the base layer picture and 'base plus enhancement layer' picture is kept low, especially on static parts of the picture where flickering is visually more obvious. The quality difference between the base layer picture and 'base plus enhancement layer' picture may be deliberately kept low by using suitable rate control techniques to increase the quality of the base layer itself. One such rate control technique may be to encode all or some of the L0 pictures with a lower QP value (i.e., a finer quantization value). For example, every L0 picture may be encoded with a QP lowered by a factor of 3. Such finer quantization may increase the quality of the base layer, thus minimizing any flickering effect or equivalent spatial artifacts caused by the loss of enhancement layer information. The lower QP value may also be applied every other L0 picture, or every four L0 pictures, with similar effectiveness in mitigating flickering and like artifacts. The specific use of a combination of SNR and spatial scalability (e.g., using HCIF coding to represent the base layer carrying QCIF quality) allows proper rate control applied to the base layer to bring static objects close to HCIF resolution, and thus reduce flickering artifacts caused when an enhancement layer is lost.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It also will be understood that in accordance with the present invention, the scalable codecs described herein may be implemented using any suitable combination of hardware and software. The software (i.e., instructions) for implementing and operating the aforementioned scalable codecs can be provided on computer-readable media, which can include without limitation, firmware, memory, storage devices, microcontrollers, microprocessors, integrated circuits, ASICS, on-line downloadable media, and other available media.

What is claimed is:

1. A system for video communication between a plurality of endpoints over an electronic communications network and one or more servers, which network provides different quality of service and bandwidth channels linking the plurality of endpoints and servers, the channels including designated high reliability channels (HRCs) and low reliability channels (LRCs), the system comprising:

transmitting and receiving terminals disposed at the endpoints, wherein at least one transmitting terminal is configured to prepare at least one scalably coded video signal for transmission to other terminals in a base layer and enhancement layers format, and to transmit at least the base layer over a designated HRC, and wherein at least one receiving terminal is configured to decode the scalably coded video signal layers that are received over network channels including a designated HRC, and to reconstruct a video for local use by combining the decoded video signal layers, and wherein the servers are configured to mediate the transfer of the scalably coded video signal layers transmitted by the transmitting terminal to a receiving terminal over electronic communications network channels leading to the latter terminal.

2. The system of claim 1 wherein at least one terminal is configured to access at least one of: a live video signal for encoding and transmission; a stored video signal for encoding and transmission; a synthesized video signal for encoding and transmission and a pre-coded video signal for transmission.

3. An endpoint terminal for video communication with other endpoints over one or more servers disposed in an electronics communication network, which network provides different quality of service and bandwidth channels linking the plurality of endpoints, the channels including designated HRCs, the endpoint terminal comprising:

at least one scalable video encoder, which is configured to scalably encode at least one video signal in a base layer and enhancement layers format; and a packet multiplexer, which is configured to multiplex layers of the video signal encoded in the base layer and enhancement layers format for transmission over the electronics communication network, wherein the endpoint terminal is configured to designate at least the base layer from the base layer and enhancement layers of the video signal for transmission over the designated HRCs via a network interface controller.

4. The endpoint terminal of claim 3, further comprising an audio signal encoder whose output is connected to the packet multiplexer.

5. The terminal of claim 3, wherein the scalable video encoder is a motion-compensated, block-based codec comprised of:

a frame memory where one or more decoded frames are stored for future reference; and a reference controller configured to select the picture type (I, P, or B) as well as the pictures in the frame memory that will be used as prediction references for the picture currently encoded, wherein the codec is further configured to perform picture prediction using threads as a means of implementing temporal scalability layers.

6. The terminal of claim 5, wherein the scalable video encoder is configured to create one continuous prediction chain path for the base layer.

7. The terminal of claim 5 where the threads are picture threads comprising:

a base layer thread further comprised of pictures that are a number of pictures apart, and in which temporal prediction is performed using one or more previous pictures of the same thread; and a temporal enhancement layer thread that is comprised of the remaining pictures, and in which prediction is performed from one or more preceding base layer pictures and/or one or more preceding temporal enhancement layer pictures.

8. The terminal of claim 5 where the picture threads are comprised of:

a base layer thread further comprised of pictures that are a fixed number of pictures apart, and in which temporal prediction is performed using the immediately previous frame of the same thread;

a first temporal enhancement layer thread that is comprised of frames that are half way between those of the base layer thread, and in which prediction is performed from either the immediately preceding base layer picture or the immediately preceding first temporal enhancement layer pictures; and a second temporal enhancement layer thread that is comprised of the remaining pictures, and in which prediction is performed from either the immediately preceding second temporal enhancement layer pictures, the immediately preceding first temporal enhancement layer picture, or the immediately preceding base layer thread picture.

9. The terminal of claim 5, wherein the scalable video encoder is configured to code the base temporal layer frames using a finer quantization than quantizations used for other temporal layers, whereby the said base layer is coded more accurately than the other layers.

10. The terminal of claim 5, wherein the scalable video encoder is configured to create at least one prediction chain which terminates at an enhancement layer.

11. The terminal of claim 5, wherein the temporally predictive codec further comprises an SNR quality scalability layer encoder.

12. The terminal of claim 11 wherein the SNR quality scalability enhancement layer encoder is configured with an input the residual coding error of the base layer obtained by subtracting the decoded base layer frames from the original frames and applying a positive offset and then encoding the difference in the same manner as the base layer encoder.

13. The terminal of claim 11, wherein the SNR enhancement layers encoder is further configured to use a prediction path which is different than the prediction path for the base layer or a lower enhancement layer.

14. The terminal of claim 12, wherein the SNR enhancement layers encoder is further configured to drop the DC components of direct cosine transform (DCT) coefficients when predicting a coded video frame for a SNR quality enhancement layer.

15. The terminal of claim 12, wherein SNR enhancement layers encoder is further configured to quantize the DC and surrounding AC DCT coefficients at coarser level than the remaining DCT coefficients when encoding a video frame for an SNR quality enhancement layer.

16. The terminal of claim 11, wherein the SNR quality scalability layer decoder at the receiving endpoint is configured to display the decoded base layer frame in a desired reduced resolution by applying low-pass filtering and downsampling after decoding.

17. The terminal of claim 11, wherein the SNR quality scalability enhancement layer codec comprises an H.264 SVC FGS codec with threading.

18. The terminal of claim 17, wherein the spatial scalability layers codec comprises an H.264 SVC FGS codec that is configured to use a weighted average of previous enhancement layer pictures and a current base layer picture in a motion compensated prediction, wherein the weighting is dynamically varied to include the zero value at which value the prediction chain is terminated, whereby drift is eliminated.

19. The terminal of claim 11, wherein the SNR quality scalability layer encoder is configured to encode the differences in DCT coefficients before and after quantization by requantizing the differences and applying entropy coding to the requantized differences.

20. The terminal of claim 5, wherein the temporally predictive codec further comprises a spatial scalability layer encoder, and which is configured to low-pass filter and downsample the original input signal, wherein the lower resolution can be different than the intended display resolution, and use it as input to the base layer encoder.

21. The terminal of claim 20, wherein the spatial scalability layers encoder is configured so that a prediction path for an enhancement layer is different from that the prediction path for the base layer or a lower enhancement layer.

22. The terminal of claim 20, where the spatial scalability layers encoder is configured to:
upsample the decoded low resolution signal to the original input signal resolution;
subtract the original input signal from the upsampled decoded low resolution signal to obtain a difference signal;
apply an offset to the difference signal; and
encode the offset difference signal.

23. The terminal of claim 22, wherein the spatial scalability layers encoder is configured so that the DC and surrounding DCT AC coefficients can be quantized more coarsely than the remaining DCT AC coefficients.

24. The terminal of claim 20 wherein the spatial scalability layer encoder is configured to use bi-predictive coding when predicting a high resolution video frame, and in which the first reference picture is a decoded past full resolution picture and the second reference picture is obtained by first encoding and decoding the downsampled base layer signal, and then upsampling it to the original resolution.

25. The terminal of claim 24 wherein the spatial scalability layer encoder is comprised of an H.264 AVC encoder with bi-predictive coding, in which the upsampled decoded base layer frames are inserted as additional reference frames, and in which the temporal and spatial direct modes of motion vector prediction are used to increase compression efficiency.

26. The terminal of claim 5 comprising a base layer encoder, which further comprises at least one of a SNR quality layers encoder, spatial scalability layers encoder, and temporal enhancement layers encoder.

27. An endpoint terminal for video communication with other endpoints over one or more servers disposed in an electronics communication network, which network provides different quality of service and bandwidth channels linking the plurality of endpoints, the channels including designated HRCs, the endpoint terminal comprising:
a scalable video decoder or decoders, which is configured to scalably decode one or more video signals in a base layer and enhancement layers format; and
a packet demultiplexer, which is configured to demultiplex layers of the video signal encoded in the base layer and enhancement layers format after reception over the electronics communication network via a network interface controller.

28. The terminal of claim 27, wherein the decoder is comprised of an SNR quality scalability decoder.

29. The terminal of claim 28, where the SNR quality scalability decoder is configured to display the decoded base layer frame in a desired reduced resolution by applying low-pass filtering and downsampling after decoding.

30. The terminal of claim 28 wherein the SNR quality scalability enhancement layer decoder is configured to add to the decoded base layer frames the decoded residual error carried by the enhancement layer data after subtracting a positive offset.

31. The terminal of claim 27, wherein the decoder further comprises a spatial scalability decoder.

32. The terminal of claim 31, where the spatial scalability layers decoder is configured to:

upsample the decoded base resolution signal to the enhancement layer resolution;

decode the offset difference signal carried by the enhancement layer;

subtract an offset from the decoded enhancement layer signal and add the result to the upsampled decoded base resolution signal.

33. The terminal of claim 31, where the spatial scalability layer decoder comprises an H.264 AVC decoder with bi-predictive coding support, in which the upsampled decoded base layer frames are inserted as additional reference frames.

34. The terminal of claim 5, wherein the scalable video encoder is configured to encode the input signal in two or more spatial and/or quality resolutions that may be transmitted simultaneously.

35. The terminal of claim 3, wherein the scalable coding structure may change dynamically depending on network conditions or indication of preferences by receiving endpoints, in any of the scalability dimensions.

36. A method for communication between a plurality of endpoints over an electronic communications network and one or more servers, which network provides different quality of service and bandwidth channels linking the plurality of endpoints, the channels including designated HRCs, the method comprising:

scalably coding a video signal in a base layer and enhancement layers format;

multiplexing layers of the video signal for transmission over the electronics communication network, transmitting at least the base layer from the base layer and enhancement layers of the video signal for transmission over the designated HRCs.

37. The method of claim 36, wherein multiplexing layers of the video signal for transmission over the electronics communication network further comprising multiplexing an audio signal for transmission over the electronics communication network.

38. A method for communicating encoded video signal pictures, which are scalably coded in a base and enhancement layers format, between a plurality of endpoints over an electronic communications network, the method comprising:

selecting a picture type (I, P, or B) for the picture currently being encoded as well as a prediction reference picture from the decoded pictures stored in a frame memory; and creating a temporal scalability layer by performing picture prediction using threads.

39. The method of claim 38 further comprising creating a continuous prediction chain path for the base layer.

40. The method of claim 38 wherein the picture threads include a base layer thread that includes pictures that are a number of pictures apart, and the method further comprises performing temporal prediction in each base layer picture using one or more of the preceding pictures of the said base layer picture, wherein a temporal enhancement layer thread includes the remaining pictures, and the method further comprises performing prediction in each enhancement layer picture using either one or more of the preceding base layer pictures, or one or more preceding temporal enhancement layer pictures.

41. The method of claim 38 wherein the picture threads include a base layer thread that includes pictures that are a number of pictures apart, and the method further comprises performing temporal prediction using the immediately previous frame of the same, wherein a first temporal enhancement layer thread includes that frames are half way between those of the base layer thread, and the method further comprises performing prediction from either the immediately preceding base layer frame or an immediately preceding first temporal enhancement layer thread picture, and wherein a second temporal enhancement layer thread includes the remaining frames, and the method further comprises performing temporal prediction using a frame from either the immediately preceding second temporal enhancement layer thread picture, the immediately preceding first temporal enhancement layer thread picture, or the immediately preceding base layer thread picture.

42. The method of claim 38, further comprising coding the base temporal layer frames using a finer quantization than quantizations used for other temporal layers, whereby the said base layer is coded more accurately than the other layers.

43. The method of claim 38, further comprising creating at least one prediction chain, which terminates at an enhancement layer.

44. The method of claim 38, wherein scalably coding a temporal scalability layer by performing picture prediction using threads further comprises coding a SNR quality scalability enhancement layer.

45. The method of claim 44, wherein coding a SNR quality scalability enhancement layer comprises applying a positive offset to a residual coding error of the base layer obtained by subtracting the decoded base layer frames from the original frames and then encoding the difference in the same manner as coding the base layer.

46. The method of claim 44, wherein coding a SNR quality scalability enhancement layer comprises using a prediction path which is different than the prediction path for the base layer or a lower enhancement layer.

47. The method of claim 45, wherein coding a SNR quality scalability enhancement layer comprises dropping the DC components of Discrete Cosine Transform (DCT) coefficients when encoding a picture for the SNR quality scalability enhancement layer.

48. The method of claim 45, wherein coding a SNR quality scalability enhancement layer comprises quantizing the DC and surrounding AC DCT coefficients at coarser level than the remaining DCT coefficients when encoding a video frame for the SNR quality scalability enhancement layer.

49. The method of claim 44, wherein coding a SNR quality scalability enhancement layer further comprises at the receiving endpoint displaying the decoded base layer frame in a desired reduced resolution by applying low-pass filtering and downsampling after decoding.

50. The method of claim 44, wherein coding a SNR quality scalability enhancement layer further comprises an H.264 SVC FGS codec with threading.

51. The method of claim 50, further comprising using an H.264 SVC FGS codec that is configured to use a weighted average of previous enhancement layer pictures and a current base layer picture in a motion compensated prediction, wherein the weighting is dynamically varied to include the zero value at which value the prediction chain is terminated, whereby drift is eliminated.

52. The method of claim 44, wherein coding a SNR quality scalability enhancement layer comprises encoding the differences in DCT coefficients before and after quantization by requantizing the differences and applying entropy coding to the requantized differences.

53. The method of claim 38, wherein coding the temporal quality layers further comprises encoding a spatial scalability layer by applying a low-pass filter and downsampling the original input signal, wherein the lower resolution can be different than the intended display resolution, and encoding the downsampled signal in the same manner as the base layer.

54. The method of claim 53, wherein encoding a spatial scalability layer comprises using a prediction path for an enhancement layer is different from the prediction path for the base layer or a lower enhancement layer.

55. The method of claim 53, wherein encoding a spatial scalability layer comprises:
upsampling the decoded low resolution signal to the original input signal resolution;
subtracting the original input signal from the upsampled decoded low resolution signal to obtain a difference signal;
applying an offset to the difference signal; and
encoding the offset difference signal.

56. The method of claim 55, wherein encoding a spatial scalability layer comprises:
quantizing the DC and surrounding DCT AC coefficients more coarsely than the remaining DCT AC coefficients.

57. The method of claim 53, wherein encoding a spatial scalability layer comprises:
using bi-predictive coding when predicting a high resolution video frame, and in which the first reference picture is a decoded past full resolution picture and the second reference picture is obtained by first encoding and decoding the downsampled base layer signal and then upsampling it to the original resolution.

58. The method of claim 57, wherein encoding a spatial scalability layer comprises:
comprises using an H.264 AVC encoder with bi-predictive coding, in which the upsampled decoded base layer frames are inserted as additional reference frames, and in which the temporal and spatial direct modes of motion vector prediction are used to increase compression efficiency.

59. The method of claim 38 comprising using a base layer encoder, which further comprises at least one of a SNR quality layers encoder, spatial scalability layers encoder, and temporal enhancement layers encoder.

60. A method for communicating encoded video signal pictures, which are scalably coded in a base and enhancement layers format, between a plurality of endpoints and one or more servers over an electronic communications network, the method comprising using:
a scalable video decoder or decoders, which is configured to scalably decode one or more video signals in a base layer and enhancement layers format; and
a packet demultiplexer, which is configured to demultiplex layers of the video signal encoded in the base layer and enhancement layers format after reception over the electronics communication network via a network interface controller.

61. The method of claim 60, wherein the decoder is comprised of an SNR quality scalability decoder.

62. The method of claim 61, further comprising using the SNR quality scalability decoder to display the decoded base layer frame in a desired reduced resolution by applying low-pass filtering and downsampling after decoding.

63. The method of claim 61, further comprising using the SNR quality scalability decoder to add to the decoded base layer frames the decoded residual error carried by the enhancement layer data after subtracting a positive offset.

64. The method of claim 60, wherein the decoder further comprises a spatial scalability decoder.

65. The method of claim 64, further comprising using the spatial scalability layers decoder to:
upsample the decoded base resolution signal to the enhancement layer resolution;
decode the offset difference signal carried by the enhancement layer;
subtract an offset from the decoded enhancement layer signal and add the result to the upsampled decoded base resolution signal.

66. The method of claim 64, wherein the spatial scalability layer decoder comprises an H.264 AVC decoder with bi-predictive coding support, the method further comprising inserting upsampled decoded base layer frames as additional reference frames.

67. The method of claim 38, wherein scalably coding a video signal comprises encoding the signal in two or more spatial and/or quality resolutions that may be transmitted simultaneously.

68. The method of claim 38, wherein the scalable coding structure may change dynamically depending on network conditions or indication of preferences indicated by receiving endpoints, in any of the scalability dimensions.

69. A method for video communication between a plurality of endpoints over an electronic communications network and one or more servers, which network provides different quality of service and bandwidth channels linking the plurality of endpoints and servers, the channels including designated high reliability channels (HRCs) and low reliability channels (LRCs), the method comprising:
disposing transmitting and receiving terminals at the endpoints,
configuring at least one transmitting terminal to prepare at least one scalably coded video signal for transmission to other terminals in a base layer and enhancement layers format, and to transmit at least the base layer over a designated HRC,
configuring at least one receiving terminal to decode the scalably coded video signal layers that are received over network channels including a designated HRC, and to reconstruct a video for local use by combining the decoded video signal layers, and
configuring the servers to mediate the transfer of the scalably coded video signal layers transmitted by the transmitting terminal to a receiving terminal over electronic communications network channels leading to the latter terminal.

70. The method of claim 69, wherein configuring at least one transmitting terminal comprises configuring the terminal to access at least one of: a live video signal for encoding and transmission; a stored video signal for encoding and transmission; a synthesized video signal for encoding and transmission and a pre-coded video signal for transmission.

71. A non-transitory computer readable medium comprising a set of instructions to direct a processor to perform the method in one of claims 36-70.

* * * * *